United States Patent
Hisano et al.

(10) Patent No.: US 11,349,766 B2
(45) Date of Patent: May 31, 2022

(54) BANDWIDTH ALLOCATION APPARATUS AND BANDWIDTH ALLOCATION METHOD

(71) Applicant: NIPPON TELEGRAPH AND TELEPHONE CORPORATION, Tokyo (JP)

(72) Inventors: Daisuke Hisano, Yokosuka (JP); Hiroyuki Uzawa, Atsugi (JP); Tatsuya Shimada, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/483,763

(22) PCT Filed: Jan. 31, 2018

(86) PCT No.: PCT/JP2018/003168
§ 371 (c)(1),
(2) Date: Aug. 6, 2019

(87) PCT Pub. No.: WO2018/147139
PCT Pub. Date: Aug. 16, 2018

(65) Prior Publication Data
US 2019/0394135 A1    Dec. 26, 2019

(30) Foreign Application Priority Data

Feb. 13, 2017  (JP) .............................. JP2017-024284

(51) Int. Cl.
*H04L 47/22*     (2022.01)
*H04L 5/00*      (2006.01)

(52) U.S. Cl.
CPC ............ *H04L 47/22* (2013.01); *H04L 5/0064* (2013.01); *H04L 5/0094* (2013.01)

(58) Field of Classification Search
CPC ...... H04L 47/22; H04L 5/0094; H04L 5/0064
See application file for complete search history.

(56) References Cited

U.S. PATENT DOCUMENTS

2010/0121972 A1* 5/2010 Samuels ................. H04L 47/10
                                                        709/231
2010/0316376 A1   12/2010 Qiu
(Continued)

FOREIGN PATENT DOCUMENTS

EP      3582448 A1    12/2019
JP   2015-023516 A    2/2015
(Continued)

OTHER PUBLICATIONS

Machine Translation JP 2015-212969 (Year: 2016).*
(Continued)

*Primary Examiner* — Kevin M Cunningham
(74) *Attorney, Agent, or Firm* — Harness, Dickey & Pierce, P.L.C.

(57) ABSTRACT

A bandwidth allocation apparatus includes: a traffic starting position detection unit that detects a start timing of burst traffic on the basis of the traffic information; a traffic information extraction unit that extracts information on a traffic amount of each of a plurality of traffic allocation periods from the traffic information extracted for each lower-level apparatus; a traffic amount estimation unit that calculates an average value of the traffic amount in the traffic allocation periods on the basis of the information on the traffic amount that the traffic information extraction unit has extracted for each lower-level apparatus; and a bandwidth allocation unit that allocates a first bandwidth which is an allocation bandwidth based on the average value calculated by the traffic amount estimation unit to the terminating apparatus from the start timing detected by the traffic starting position detection unit.

21 Claims, 14 Drawing Sheets

(56) References Cited

U.S. PATENT DOCUMENTS

| | | | |
|---|---|---|---|
| 2013/0039182 A1 | 2/2013 | Das et al. | |
| 2014/0213273 A1* | 7/2014 | Xie | H04W 72/1268 |
| | | | 455/452.1 |
| 2014/0307818 A1* | 10/2014 | Jindal | H04W 24/08 |
| | | | 375/267 |
| 2015/0326337 A1 | 11/2015 | Yoshida et al. | |
| 2017/0250777 A1* | 8/2017 | Sarashina | H04J 14/08 |
| 2018/0309563 A1* | 10/2018 | Hisano | H04B 10/2971 |

FOREIGN PATENT DOCUMENTS

| | | | |
|---|---|---|---|
| JP | 2015212969 | * | 11/2016 |
| JP | 2016-220033 A | | 12/2016 |
| WO | WO-2014018072 A1 | | 1/2014 |

OTHER PUBLICATIONS

Extended European Search Report from counterpart EP187516026, dated Jul. 1, 2020.

Japanese Notice of Allowance for counterpart JP2018567383, dated Jan. 28, 2020.

"NTT Technical Journal, Technology Basic Course [GE-PON Technology], Part 1: PON", [online], 2005, Nippon Telegraph and Telephone Corporation, [accessed May 21, 2015], Internet <URL http://www.ntt.co.jp/journal/0508/files/jn200508071.pdf>.

T. Kobayashi, H. Ou, D. Hisano, T. Shimada, J. Terada and A. Otaka, "Bandwidth Allocation scheme based on Simple Statistical Traffic Analysis for TDM-PON based Mobile Fronthaul," in Proc. of OFC2016, paper W3C.7, 2016.

International Search Report (English and Japanese) issued in International Application No. PCT/JP2018/003168, dated Apr. 24, 2018; ISA/JP.

* cited by examiner

BANDWIDTH ALLOCATION APPARATUS AND BANDWIDTH ALLOCATION METHOD

CROSS-REFERENCE TO RELATED APPLICATIONS

This application is a 371 U.S. National Phase of International Application No. PCT/JP2018/003168, filed on Jan. 31, 2018, which claims priority to Japanese Application No. 2017-024284, filed on Feb. 13, 2017. The entire disclosures of the above applications are incorporated herein by reference.

TECHNICAL FIELD

The present invention relates to a bandwidth allocation apparatus and a bandwidth allocation method.

BACKGROUND ART

A radio communication system in which an antenna unit (remote radio head: RRH) and a signal-processing unit (baseband unit: BBU) of a radio base station are separate is known. In this radio communication system, an RRH and a BBU are connected by an optical device and an optical fiber and this optical segment is called a mobile front haul (MFH). FIG. 11 is a diagram illustrating a configuration example of an MFH.

In recent years, in order to reduce the cost of an MFH, research on accommodating RRHs using a time-division multiplexing-passive optical network (TDM-PON) system (for example, see Non-Patent Document 1) has been conducted (for example, see Non-Patent Document 2). In a TDM-PON system, a time-division multiple-access (TDMA) scheme is used for transmitting signals from an optical terminating apparatus (ONU: optical network unit) to an optical terminal station apparatus (OLT: optical line terminal). There is a proposed method of estimating the amount of traffic transmitted to MFHs on the basis of traffic information between RRHs and radio terminals and dynamically changing a bandwidth allocated from an optical terminal station apparatus to an optical terminating apparatus when RRHs are accommodated using TDM-PON (for example, see Non-Patent Document 2).

FIG. 12 is a block diagram illustrating a configuration of a conventional terminal station apparatus.

A traffic information acquisition unit acquires uplink signals or downlink signals in respective bandwidth allocation periods. Here, a bandwidth allocation period is a period in which a terminal station apparatus (for example, an OLT) transmits a signal containing information to provide uplink transmission permission to a terminating apparatus (for example, ONU). A traffic information extraction unit separates and extracts the amount of traffic acquired by the traffic information acquisition unit in respective arbitrary periods. Separate periods are defined as traffic periods. A traffic amount estimation unit calculates, in each traffic period, an average value μ and a standard deviation σ of the amounts of traffic in a plurality of bandwidth allocation periods included in the traffic period.

As illustrated in FIG. 13, an RRH connected to a terminating apparatus buffers radio signals transmitted from radio terminals for a predetermined period only and performs a demodulation and decoding operation at once. In this way, signals arriving at the terminating apparatus (ONU) from the RRH are burst traffic. As illustrated in FIG. 14, this burst traffic arrives at the terminating apparatus (ONU) while maintaining a constant time interval called as a transmission time interval (TTI). A TTI indicates the smallest unit of radio scheduling. The time length of a TTI is equal to the length of one sub-frame. In the case of LTE, since the radio scheduling period is 1 ms, the time length of one TTI is 1 ms. Shortening of the TTI has been considered in the fifth generation mobile communication system (5G), which is a future mobile access scheme.

A traffic starting position detection unit detects a starting position of each item of burst traffic by referring to the traffic information transmitted from the traffic information acquisition unit. The traffic starting position detection unit transmits information on the detected starting position to a bandwidth allocation amount calculation unit. The bandwidth allocation amount calculation unit calculates a bandwidth allocation amount and an allocation timing on the basis of the information transmitted from the traffic amount estimation unit and the traffic starting position detection unit. FIG. 15 illustrates a conventional allocation scheme in the bandwidth allocation amount calculation unit. As illustrated in Equation (1), the bandwidth allocation amount calculation unit starts bandwidth allocation from the starting position of a TTI and determines a bandwidth allocation amount B of each terminating apparatus on the basis of an average value μ and a standard deviation σ.

[Math. 1]

$$B = \mu + n\sigma \quad (1)$$

Here, n is a constant calculated from a hazard rate. Moreover, when a terminating apparatus having obtained transmission permission in an $i^{th}$ order is ONU #i, a bandwidth allocation amount B, an average value μ, and a standard deviation σ of the ONU #i will be denoted by a bandwidth allocation amount $B^{(i)}$, an average value $\mu^{(i)}$, and a standard deviation $\sigma^{(i)}$, respectively. Moreover, FIG. 16 is a flowchart illustrating a bandwidth allocation process of a conventional bandwidth allocation amount calculation unit.

CITATION LIST

Patent Literature

Non-Patent Document 1: "NTT Technical Journal, Basic Technology Course [GE-PON Technology], Part 1: PON", [online], 2005, Nippon Telegraph and Telephone Corporation, [Retrieved on May 21, 2015], Internet <URL http://www.ntt.co.jp/journal/0508/files/jn2005-0871.pdf>

Non-Patent Document 2: T. Kobayashi, H. Ou, D. Hisano, T. Shimada, J. Terada, and A. Otaka, "Bandwidth Allocation scheme based on Simple Statistical Traffic Analysis for a TDM-PON based Mobile Fronthaul," in Proc. of OFC 2016, paper W3C, 7, 2016

SUMMARY OF INVENTION

Technical Problem

In a TDM-PON, when a plurality of ONUs are connected, an OLT gives transmission permission sequentially to respective ONUs within a bandwidth allocation period. Due to this, an ONU #N having obtained transmission permission in an $N^{th}$ order or later remains in a waiting state until ONU #1 to ONU #(N−1) having obtained transmission permission in first to $(N−1)^{th}$ orders finish transmission of signals. The longer waiting period, the more likely it is to cause a delay.

When conventional bandwidth allocation is used, a long transmission permission period is applied to traffic generated. For example, when an average throughput μ of uplink signals is 100 Mbps (megabits per second), a standard deviation σ is 20 Mbps, and the constant n is 6, an allocation bandwidth is calculated as B=100+6×20=220 Mbps by Equation (1). However, when concentration of a traffic occurrence distribution near an average throughput is taken into consideration. 120 Mbps is allocated in order to cope with abruptly increasing traffic. An ONU having obtained the next transmission opportunity remains in a transmission waiting state until a bandwidth allocation of 220 Mbps is completed.

Moreover, there is a possibility that an ONU which issues a new connection request may be present while a bandwidth allocation operation is being performed. In a TDM-PON, a window called an activation window is provided in each predetermined period. In a period in which an activation window is provided, the newly-connected ONU can transmit an authentication request signal to an OLT. Bandwidth allocation is stopped during the activation window period in order to prevent interference between the signal transmitted for the authentication and the signals transmitted by already-connected ONUs. Due to this, an instantaneous delay corresponding to the activation window period occurs in the already-connected ONUs.

With the foregoing in view, an object of the present invention is to provide a bandwidth allocation apparatus and a bandwidth allocation method in which a bandwidth is able to be allocated such that a delay in terminating apparatuses connected to a terminal station apparatus according to time-division multiple-access is prevented.

Solution to Problem

A bandwidth allocation apparatus according to a first aspect of the present invention includes: a traffic information acquisition unit configured to acquire traffic information indicating the traffic of communication that each lower-level apparatus performs via a respective terminating apparatus for each lower-level apparatus connected to the respective terminating apparatus; a traffic starting position detection unit configured to detect a start timing of burst traffic on the basis of the traffic information; a traffic information extraction unit configured to extract information on a traffic amount of each of traffic allocation periods from the traffic information extracted for each lower-level apparatus; a traffic amount estimation unit configured to calculate, for each lower-level apparatus, an average value of the traffic amount in the traffic allocation periods on the basis of the information on the traffic amount that the traffic information extraction unit has extracted; and a bandwidth allocation unit configured to allocate a first bandwidth which is an allocation bandwidth based on the average value calculated by the traffic amount estimation unit to each terminating apparatus from a start of the bandwidth allocation period, the start timing detected by the traffic starting position detection unit being used as the start timing of the bandwidth allocation period.

According to a second aspect of the present invention, in the bandwidth allocation apparatus according to the first aspect, the traffic amount estimation unit is configured to calculate, for each lower-level apparatus, a standard deviation of the traffic amount in the traffic allocation periods on the basis of the information on the traffic amount extracted by the traffic information extraction unit, and the bandwidth allocation unit is configured to allocate a second bandwidth which is an allocation bandwidth based on the standard deviation calculated by the traffic amount estimation unit to each terminating apparatus after the end of allocation of the first bandwidth and allocate a surplus bandwidth which is the first bandwidth and the second bandwidth subtracted from an allocatable bandwidth in the bandwidth allocation period to each terminating apparatus in a surplus bandwidth allocation period which is a period from the end of allocation of the second bandwidth to the end of the bandwidth allocation period.

According to a third aspect of the present invention, in the bandwidth allocation apparatus according to the second aspect, the bandwidth allocation unit is configured to calculate the first bandwidth to be allocated to each terminating apparatus according to a ratio of the average value in a relevant terminating apparatus to a sum of the average values in all terminating apparatuses, and the bandwidth allocation unit is configured to calculate the second bandwidth to be allocated to each terminating apparatus according to a ratio of the standard deviation in a relevant terminating apparatus to a sum of the standard deviations in all terminating apparatuses.

According to a fourth aspect of the present invention, the bandwidth allocation apparatus according to the second or third aspect further includes: a newly-connected terminating apparatus authentication unit configured to set an authentication period for detecting a newly-connected terminating apparatus in the surplus bandwidth allocation period, and the bandwidth allocation unit is configured not to allocate a bandwidth to the terminating apparatus in the authentication period notified from the newly-connected terminating apparatus authentication unit.

According to a fifth aspect of the present invention, the bandwidth allocation apparatus according to the second or third aspect further includes: a traffic excess determination-processing unit configured to instruct the bandwidth allocation unit to perform bandwidth allocation again when a traffic amount of an uplink signal transmitted from the terminating apparatus using the second bandwidth exceeds a threshold.

According to a sixth aspect of the present invention, the bandwidth allocation apparatus according to the second or third aspect further includes: a traffic excess determination-processing unit configured to instruct the bandwidth allocation unit to perform bandwidth allocation again when an uplink signal which uses the surplus bandwidth is transmitted from the terminating apparatus.

According to a seventh aspect of the present invention, in the bandwidth allocation apparatus according to the first aspect, the bandwidth allocation unit is configured to calculate, for each lower-level apparatus, a bandwidth by multiplying a bandwidth allocatable to each lower-level apparatus by a ratio of the average value in a relevant lower-level apparatus to a sum of the average values calculated by the traffic amount estimation unit, and the bandwidth allocation unit is configured to allocate a bandwidth indicated by a first threshold to the lower-level apparatus in which the calculated bandwidth exceeds the first threshold and evenly distribute a non-allocated bandwidth within the allocatable bandwidth to the lower-level apparatus in which the calculated bandwidth is equal to or smaller than the first threshold.

According to an eighth aspect of the present invention, in the bandwidth allocation apparatus according to the seventh aspect, the bandwidth allocation unit is configured to allocate a bandwidth indicated by the first threshold to the lower-level apparatus in which the calculated bandwidth exceeds the first threshold, allocate a bandwidth indicated by a second threshold to the lower-level apparatus in which the calculated bandwidth is equal to or smaller than the first threshold and is equal to or larger than the second threshold, which is smaller than the first threshold, and allocate a non-allocated bandwidth within the allocatable bandwidth to the lower-level apparatus in which the calculated bandwidth is equal to or smaller than the second threshold.

According to a ninth aspect of the present invention, a bandwidth allocation method performed by a bandwidth allocation apparatus includes: a traffic information acquisition step of acquiring traffic information indicating the traffic of communication that each lower-level apparatus performs via a respective terminating apparatus for each lower-level apparatus connected to the respective terminating apparatus; a traffic starting position detection step of detecting a start timing of burst traffic on the basis of the traffic information; a traffic information extraction step of extracting information on a traffic amount of each of traffic allocation periods from the traffic information extracted for each lower-level apparatus; a traffic amount estimation step of calculating, for each lower-level apparatus, an average value of the traffic amount in the traffic allocation periods on the basis of the information on the traffic amount extracted; and a bandwidth allocation step of allocating a first bandwidth which is an allocation bandwidth based on the calculated average value to each terminating apparatus from a start of the bandwidth allocation period, the detected start timing of the burst traffic being used as the start timing of the bandwidth allocation period.

Advantageous Effects of Invention

According to the present invention, it is possible to allocate a bandwidth so as to reduce a delay in terminating apparatuses connected to a terminal station apparatus according to time-division multiple-access.

DESCRIPTION OF EMBODIMENTS

Hereinafter, embodiments of the present invention will be described with reference to the drawings.

First Embodiment

Figure 1:
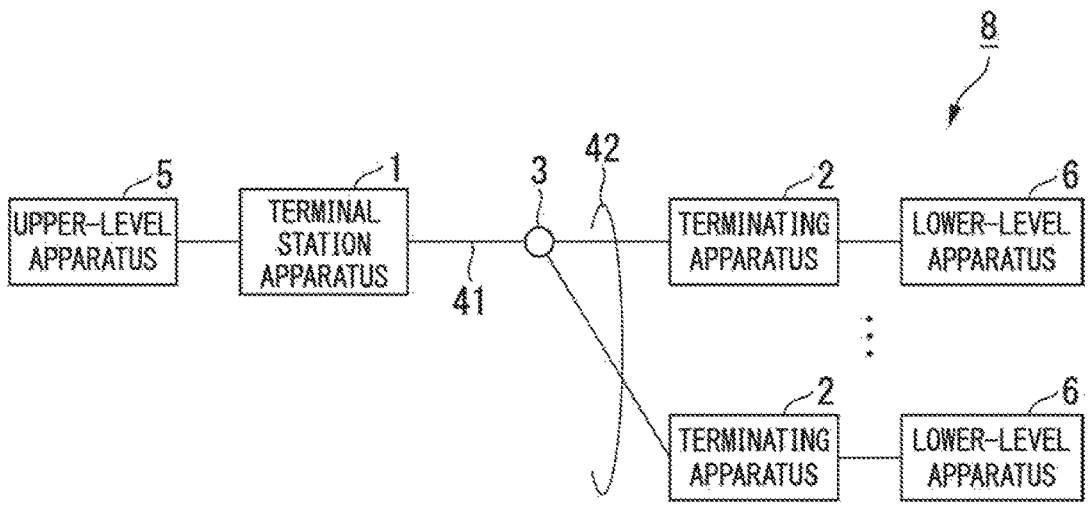
FIG. 1 is a diagram illustrating a configuration of an access network system according to a first embodiment of the present invention.

FIG. 1 is a diagram illustrating a configuration of an access network system 8 according to a first embodiment. The access network system 8 has a configuration in which a relay transmission system having a terminal station apparatus 1, a terminating apparatus 2, and an optical splitter 3 accommodates a communication system having an upper-level apparatus 5 and a lower-level apparatus 6. A system accommodating a communication system means that the system relays the communications in the communication system.

A relay transmission system is an optical relay transmission system such as a passive optical network (PON) system, for example. When the relay transmission system is a PON system, the terminal station apparatus 1 is an optical terminal station apparatus (OLT) and the terminating apparatus 2 is an optical terminating apparatus (ONU). The direction from the terminal station apparatus 1 to the terminating apparatus 2 is downlink and the direction from the terminating apparatus 2 to the terminal station apparatus 1 is uplink. The optical splitter 3 distributes time-division-multiplexed (TDM) optical signals transmitted by one optical fiber 41 from the terminal station apparatus 1 to optical fibers 42 connected to a plurality of terminating apparatuses 2. Moreover, the optical splitter 3 combines time-division multiple-access (TDMA) optical signals transmitted from the optical fibers 42 connected to the plurality of terminating apparatuses 2 and outputs a combined optical signal to the optical fiber 41. The terminal station apparatus 1 has the function of a bandwidth allocation apparatus that allocates bandwidth to the respective terminating apparatuses 2 and executes a bandwidth allocation method.

The communication system is a mobile network, for example. When the communication system is a mobile network, the upper-level apparatus 5 is a signal-processing unit (BBU) of a radio base station and the lower-level apparatus 6 is an antenna unit (RRH) of a radio base station. An RRH performs radio communication with a mobile radio terminal according to a TDD scheme. The relay transmission system can accommodate a plurality of communication systems.

Figure 2:
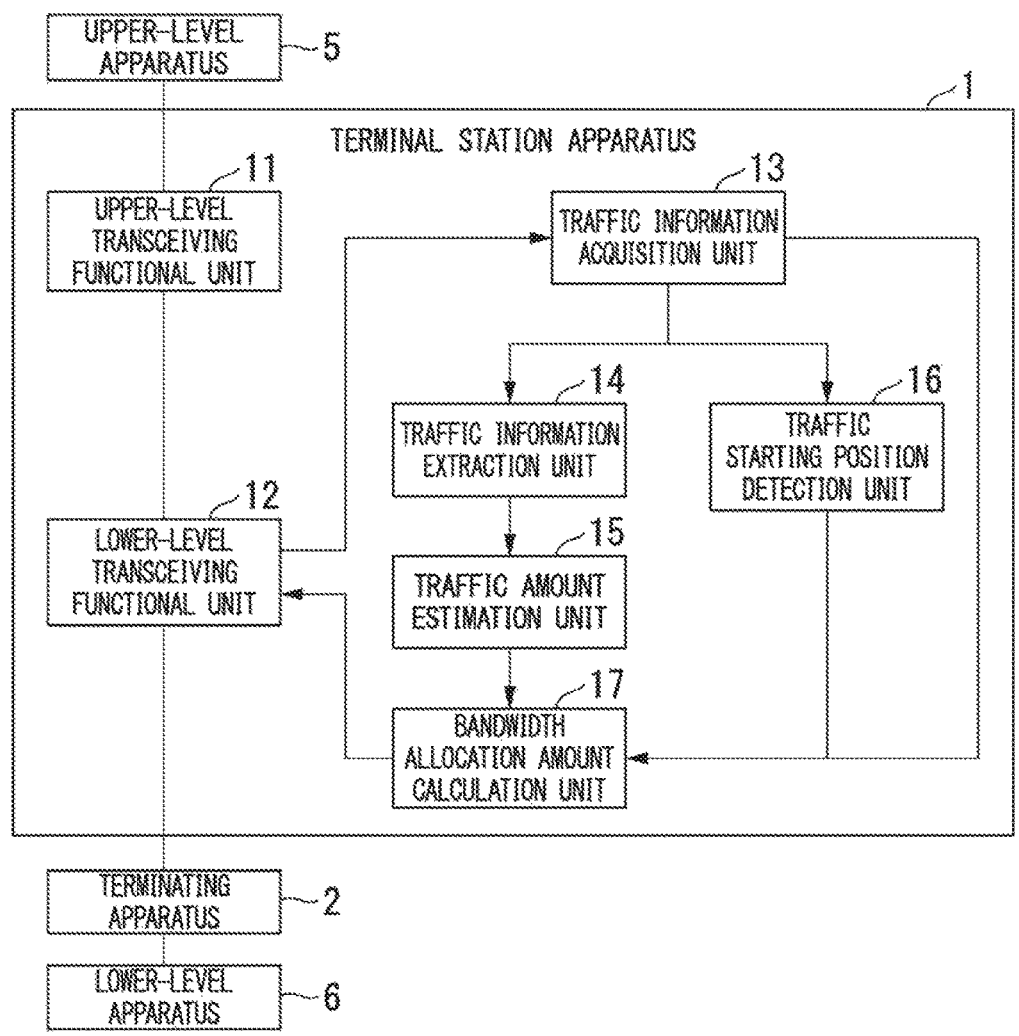
FIG. 2 is a functional block diagram illustrating a configuration of a terminal station apparatus according to the first embodiment.
Figure 12:
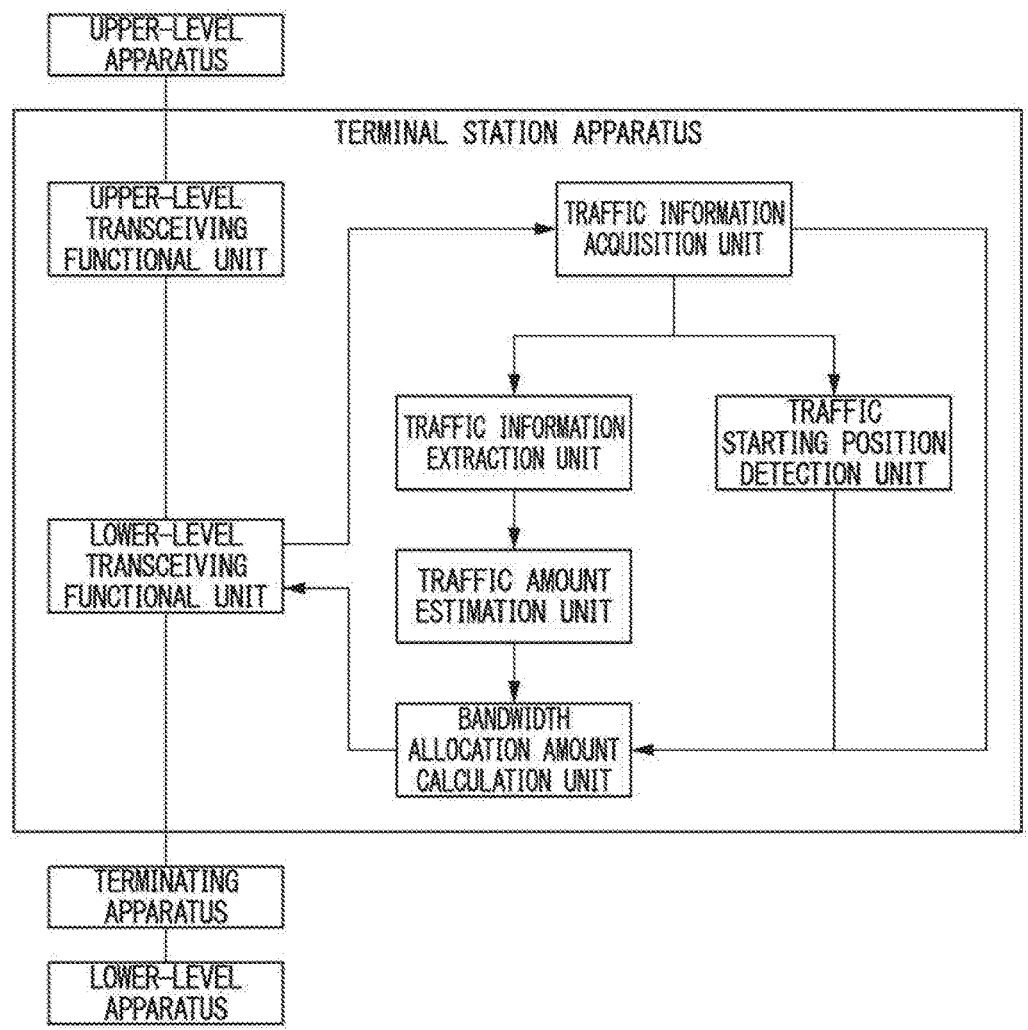
FIG. 12 is a diagram illustrating a configuration of a terminal station apparatus according to a conventional technology.
Figure 13:
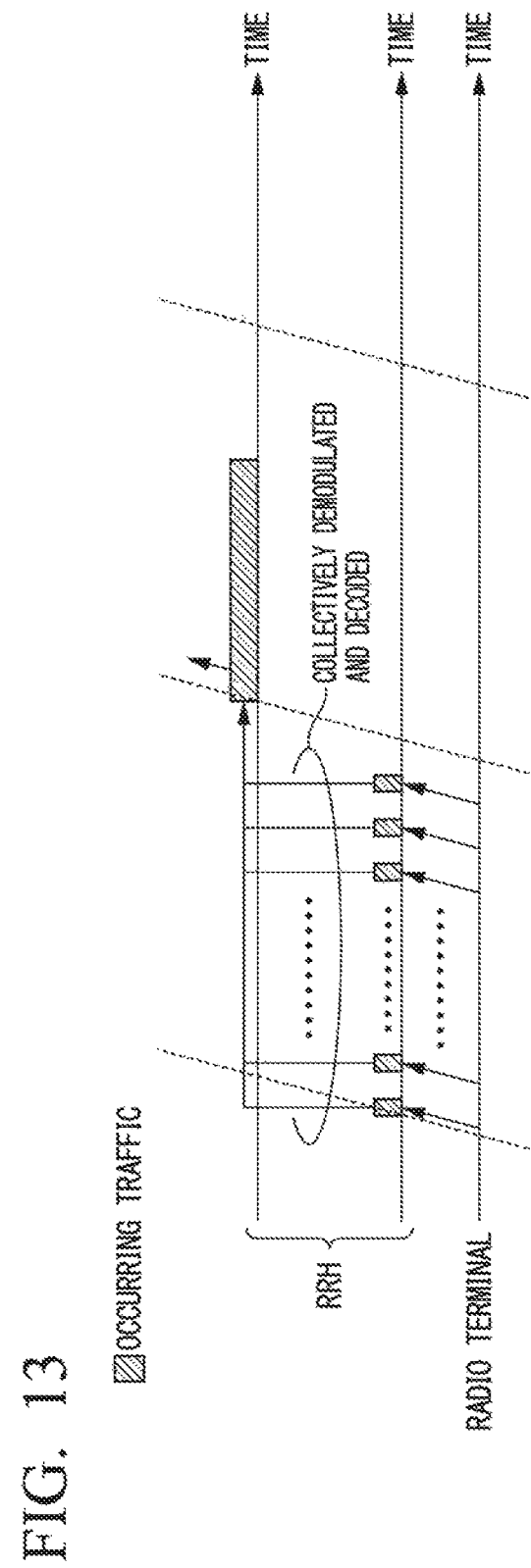
FIG. 13 is a diagram illustrating an example of a traffic model in which a burst signal occurs.
Figure 14:
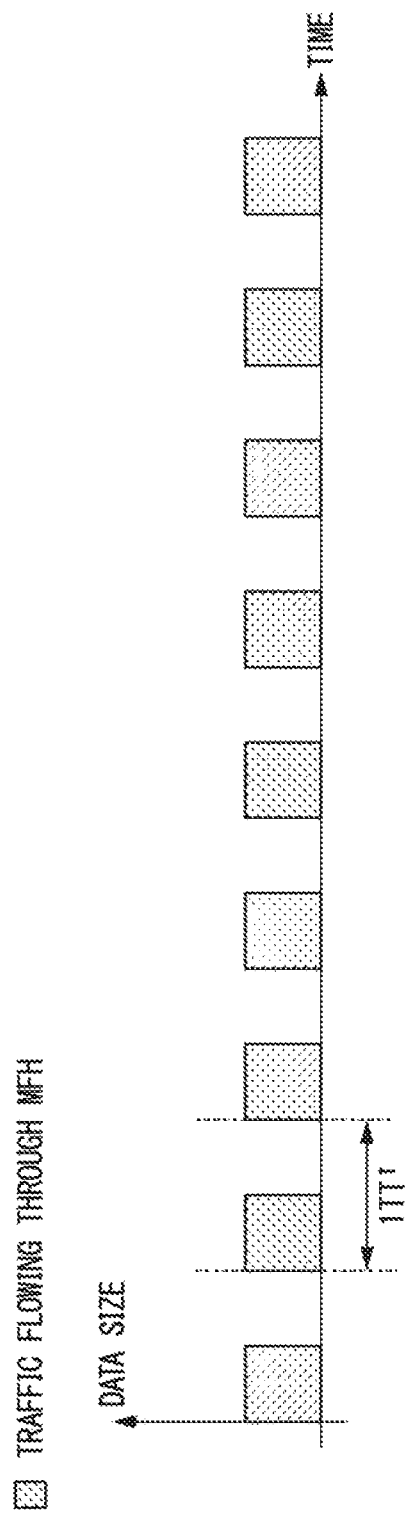
FIG. 14 is a diagram illustrating an example of traffic flowing through an MFH.
Figure 15:
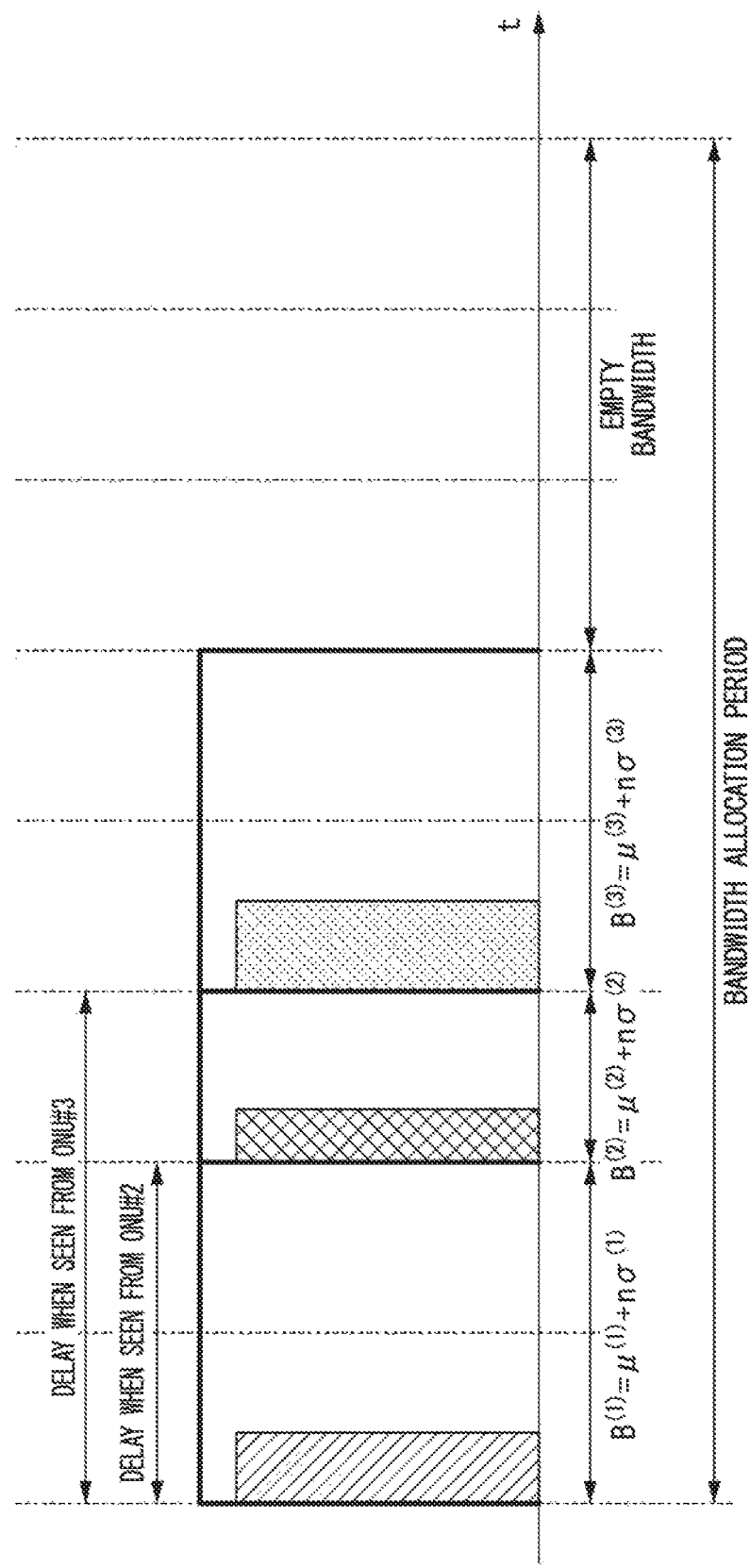
FIG. 15 is a diagram illustrating bandwidth allocation to a terminating apparatus according to a conventional technology.
Figure 16:
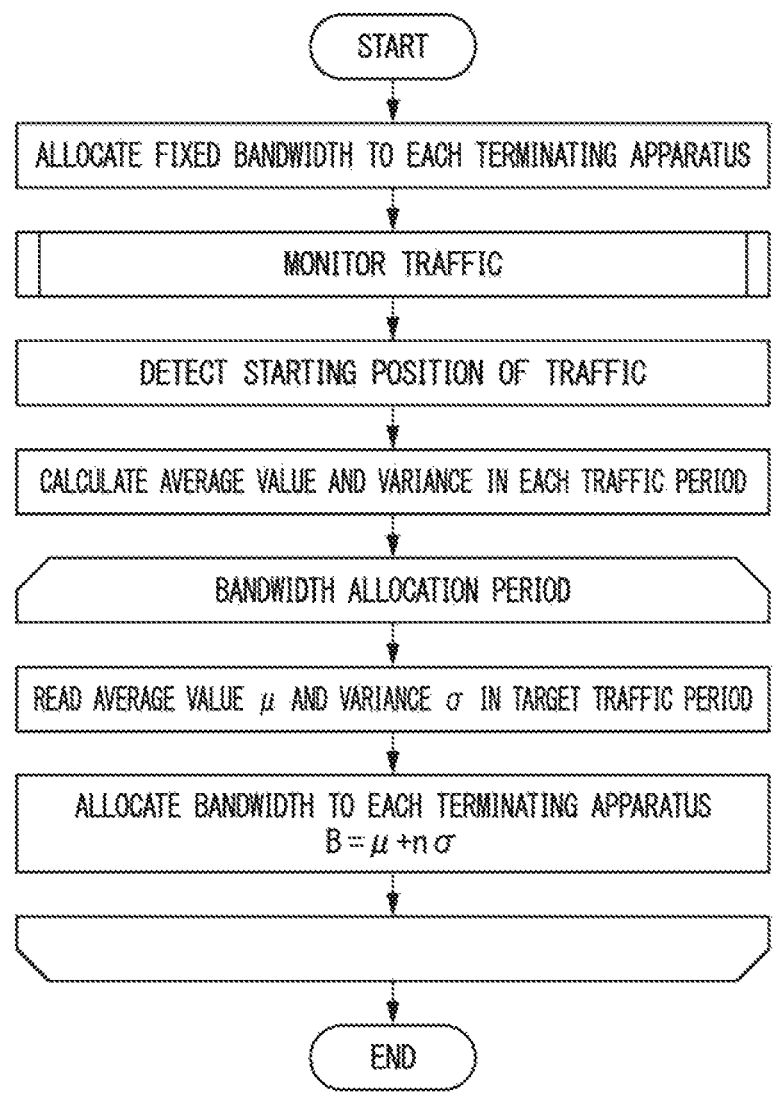
FIG. 16 is a flowchart illustrating a bandwidth allocation process of a terminal station apparatus according to a conventional technology.

FIG. 2 is a functional block diagram illustrating a configuration of the terminal station apparatus 1 and extracts and illustrates functional blocks related to the first embodiment. The terminal station apparatus 1 includes an upper-level transceiving functional unit 11, a lower-level transceiving functional unit 12, a traffic information acquisition unit 13, a traffic information extraction unit 14, a traffic amount estimation unit 15, a traffic starting position detection unit 16, and a bandwidth allocation amount calculation unit 17. The functions of the upper-level transceiving functional unit 11, the lower-level transceiving functional unit 12, the traffic information acquisition unit 13, the traffic information extraction unit 14, the traffic amount estimation unit 15, and the traffic starting position detection unit 16 are similar to those of the conventional terminal station apparatus illustrated in FIG. 12.

The upper-level transceiving functional unit 11 is an interface that performs transmission/reception of data to and from the upper-level apparatus 5. The upper-level transceiving functional unit 11 outputs a downlink signal addressed to the lower-level apparatus 6 received from the upper-level apparatus 5 to the lower-level transceiving functional unit 12. Moreover, the upper-level transceiving functional unit 11 transmits an uplink signal addressed to the upper-level apparatus 5 from the lower-level apparatus 6, received from the lower-level transceiving functional unit 12, to the upper-level apparatus 5.

The lower-level transceiving functional unit 12 is an interface that performs transmission/reception of data to and from the terminating apparatus 2. The lower-level transceiving functional unit 12 converts the downlink signal output from the upper-level transceiving functional unit 11 and a control signal output from the bandwidth allocation amount calculation unit 17 from an electrical signal into an optical signal and outputs the optical signal to the terminating apparatus 2. Moreover, the lower-level transceiving functional unit 12 converts the uplink signal received from the terminating apparatus 2 from an optical signal into an electrical signal and outputs the electrical signal to the upper-level transceiving functional unit 11. The electrical signal that the lower-level transceiving functional unit 12 outputs to the upper-level transceiving functional unit 11 includes the uplink signal addressed to the upper-level apparatus 5 from the lower-level apparatus 6. Furthermore, the lower-level transceiving functional unit 12 transmits the uplink signal converted into the electrical signal to the traffic information acquisition unit 13. The lower-level transceiving functional unit 12 may output only a main signal of the uplink signal to the traffic information acquisition unit 13.

The traffic information acquisition unit 13 acquires the uplink signals from each terminating apparatus 2 in each bandwidth allocation period and stores traffic information indicating a traffic amount of the uplink signals in each bandwidth allocation period. The bandwidth allocation period is a period in which the terminal station apparatus 1 transmits a signal containing information to give uplink transmission permission to the terminating apparatus 2.

The traffic information extraction unit 14 separates and extracts the traffic information acquired by the traffic information acquisition unit 13 in each arbitrary period. The arbitrary period may be defined such that N seconds of traffic is evenly divided by M and N/M is one period, or alternatively. N seconds of traffic is separated into different time lengths such as $M_1, M_2, \ldots, M_i$ rather than dividing evenly and each separate period is one period. The separate periods are traffic periods. One traffic period includes a plurality of bandwidth allocation periods. The traffic information extraction unit 14 transmits the extracted traffic information in each traffic period to the traffic amount estimation unit 15.

The traffic amount estimation unit 15 acquires, in each traffic period, the traffic amount in each of a plurality of bandwidth allocation periods included in the traffic period from the traffic information with respect to each terminating apparatus 2 and calculates an average value $\mu$ and a standard deviation $\sigma$ of the traffic amount. The traffic amount estimation unit 15 transmits the calculation result of the average value $\mu$ and the standard deviation $\sigma$ of the traffic amount in each traffic period of each terminating apparatus 2 to the bandwidth allocation amount calculation unit 17.

The traffic starting position detection unit 16 detects the starting position of each item of burst traffic and outputs information indicating the detected starting position to the bandwidth allocation amount calculation unit 17. The starting position of the burst traffic corresponds to the start of TTI, for example. The bandwidth allocation amount calculation unit 17 calculates a bandwidth allocation amount and an allocation timing of each terminating apparatus 2 in the bandwidth allocation period on the basis of the information transmitted from the traffic amount estimation unit 15 and the traffic starting position detection unit 16.

Figure 3:
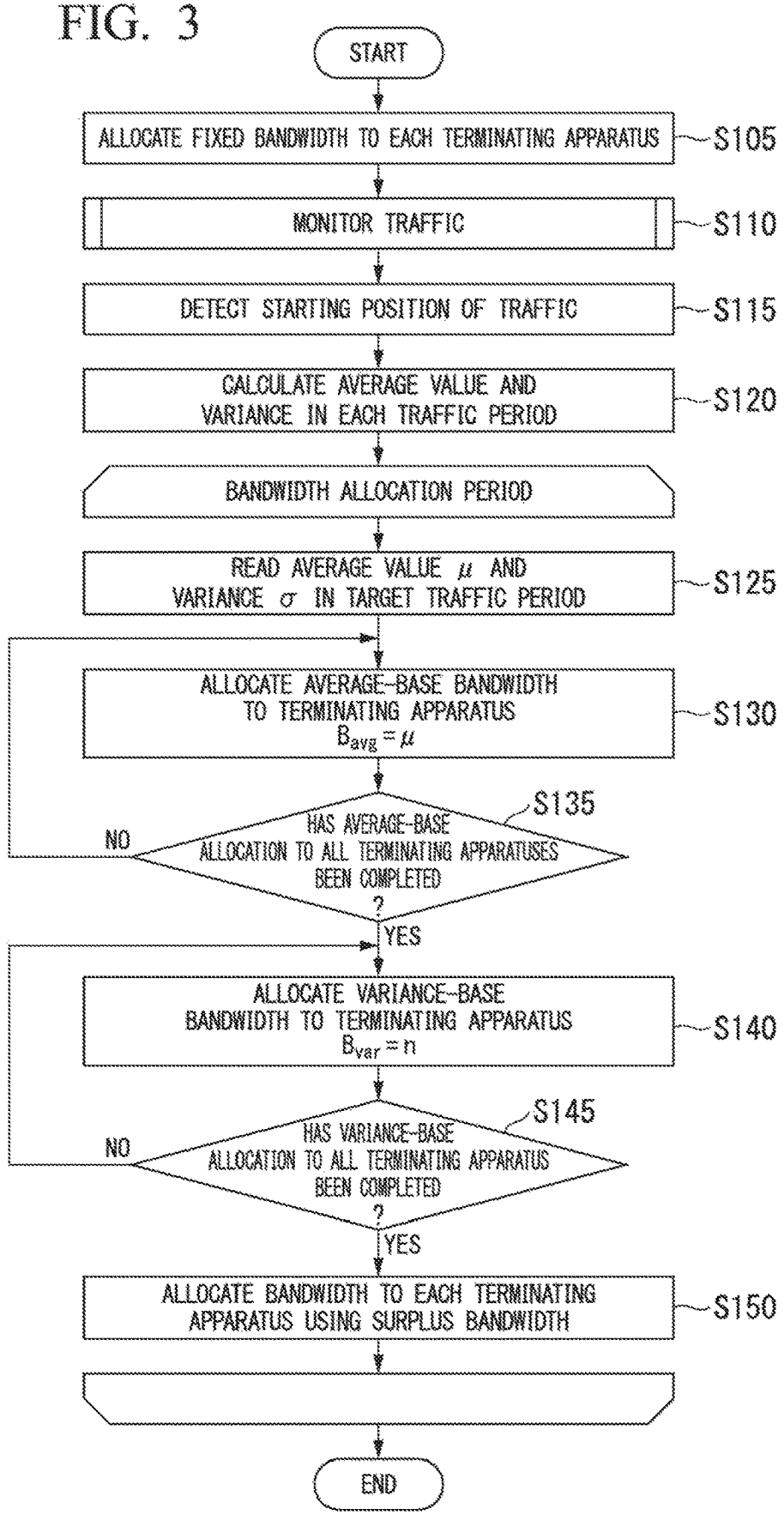
FIG. 3 is a flowchart illustrating a bandwidth allocation process of the terminal station apparatus according to the first embodiment.

FIG. 3 is a flowchart illustrating the operation of the terminal station apparatus 1.

First, the bandwidth allocation amount calculation unit 17 of the terminal station apparatus 1 allocates a fixed bandwidth to each terminating apparatus 2 in each dynamic bandwidth allocation (DBA) period in order to collect traffic. The DBA period is a period in which bandwidth is allocated to the terminating apparatus 2. The lower-level transceiving functional unit 12 notifies each terminating apparatus 2 of the fixed bandwidth allocated by the bandwidth allocation amount calculation unit 17 as the allocation bandwidth of each DBA period. Each terminating apparatus 2 transmits uplink data received from the lower-level apparatus 6 to the terminal station apparatus 1 according to the allocated fixed bandwidth (step S105). The traffic information acquisition unit 13 of the terminal station apparatus 1 acquires the uplink signal received by the lower-level transceiving functional unit 12 over a plurality of periods in each bandwidth allocation period and stores the traffic amount of the uplink signals acquired by the respective terminating apparatuses 2 as traffic information (step S110).

After a traffic monitor period ends, the traffic starting position detection unit 16 detects the starting position of each item of burst traffic by referring to the traffic information and outputs information indicating the detected starting position to the bandwidth allocation amount calculation unit 17 (step S115). The traffic information extraction unit 14 extracts the traffic information acquired by the traffic information acquisition unit 13 in each traffic period and transmits the extracted traffic information to the traffic amount estimation unit 15. The traffic amount estimation unit 15 calculates an average value $\mu$ and a standard deviation $\sigma$ of the traffic amount in the DBA period of each terminating apparatus 2 in each traffic period on the basis of the traffic information transmitted from the traffic information extraction unit 14 and transmits the calculation result to the bandwidth allocation amount calculation unit 17 (step S120).

The bandwidth allocation amount calculation unit 17 performs the following processes of steps S125 to S150 in each bandwidth allocation period.

The bandwidth allocation amount calculation unit 17 reads the average value p and the standard deviation $\sigma$ of the traffic amount of each terminating apparatus 2 in a traffic period corresponding to a target bandwidth allocation period in which bandwidth allocation is performed from the traffic amount estimation unit 15 (step S125). The bandwidth allocation amount calculation unit 17 allocates a bandwidth $B_{avg}$ based on the average value µ of a previous traffic amount to each terminating apparatus 2 as illustrated in Equation (2) (step S130). The superscript (i) indicates an $i^{th}$ terminating apparatus 2 among the plurality of terminating apparatuses 2 connected to the terminal station apparatus 1. The traffic period used in step S125 is a predetermined number of traffic periods immediately before a target bandwidth allocation period, for example.

[Math. 2]

$$B_{avg}^{(i)} = \mu^{(i)} \quad (2)$$

Figure 4:
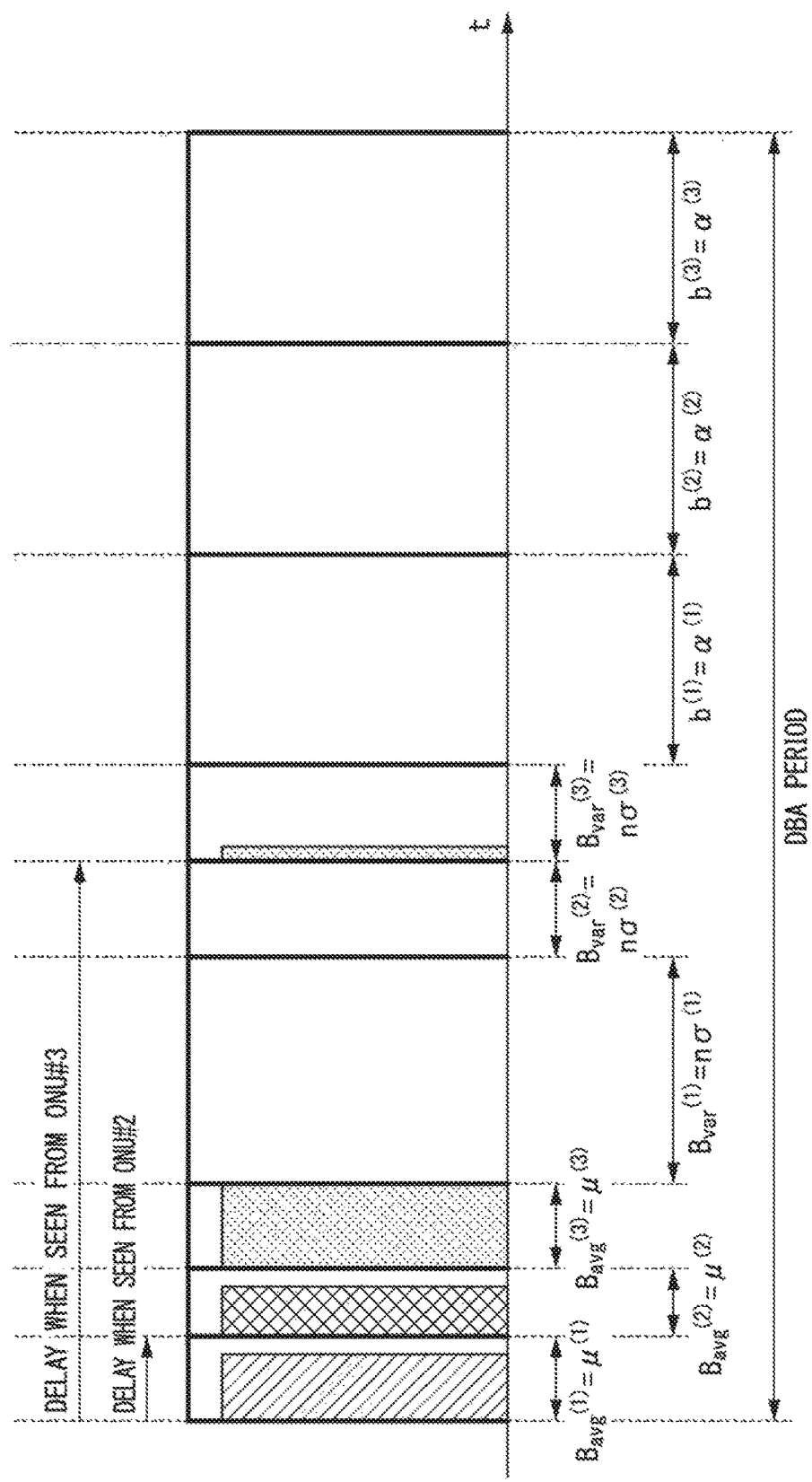
FIG. 4 is a diagram illustrating bandwidth allocation to a terminating apparatus according to the first embodiment.

FIG. 4 is a diagram illustrating allocation of bandwidth to each terminating apparatus 2. As illustrated in FIG. 4, when a bandwidth allocation target-terminating apparatus 2 is three ONUs of ONU #1 to ONU #3, the bandwidth allocation amount calculation unit 17 allocates bandwidths $B_{avg}(1)$ to $B_{avg}(3)$ to ONU #1 to ONU #3, respectively, sequentially from the start of the DBA period.

When allocation of the average-base bandwidth $B_{avg}$ based on Equation (2) to all terminating apparatuses 2 is completed (step S135), as illustrated in Equation (3), the bandwidth allocation amount calculation unit 17 allocates a variance-base bandwidth $B_{var}$ which uses the standard deviation σ of traffic amount sequentially to the respective terminating apparatuses 2 (step S140). Here, n is a constant calculated from a hazard rate, and the lower the hazard rate, the larger becomes the value n.

[Math. 3]

$$B_{var}^{(i)} = n^{(i)} \sigma^{(i)} \quad (3)$$

In the bandwidth allocation illustrated in FIG. 4, after bandwidths $B_{avg}(1)$ to $B_{avg}(3)$ are allocated to the three ONUs of ONU #1 to ONU #3, respectively, variance-base bandwidths $B_{var}(1)$ to $B_{var}(3)$ are allocated. The bandwidth allocation based on these equations (2) and (3) may be subdivided further.

After allocation of the bandwidth $B_{var}$ based on Equation (2) to all terminating apparatuses 2 is completed (step S145), the bandwidth allocation amount calculation unit 17 allocates a surplus bandwidth $B_{surplus}$ in the DBA period to the terminating apparatus 2. The traffic amount estimation unit 15 calculates the surplus bandwidth $B_{surplus}$ according to Equation (4).

[Math. 4]

$$B_{surplus} = B_{all} - \Sigma_i B_{avg}^{(i)} - \Sigma_i B_{var}^{(i)} \quad (4)$$

Here, $B_{all}$ indicates all bandwidth usable in the DBA period of TDM-PON. For example, in the case of 10G-PON, $B_{all}$ is 10 gigabits per second (Gbps) when an overhead is not taken into consideration.

The bandwidth allocation amount calculation unit 17 allocates bandwidth to each terminating apparatus 2 using the surplus bandwidth $B_{surplus}$ calculated by the traffic amount estimation unit 15 (step S150). In allocation of the surplus bandwidth $B_{surplus}$, a fixed bandwidth may be allocated equally to each terminating apparatus 2, or a bandwidth allocation amount may be changed for respective terminating apparatuses 2 depending on a type such as priority. The surplus bandwidth $B_{surplus}$ may be used as a bandwidth for accommodating other services in addition to being allocated to each terminating apparatus 2. In the surplus bandwidth $B_{surplus}$ period, the terminal station apparatus 1 and each terminating apparatus 2 may perform a sleep operation. In the bandwidth allocation illustrated in FIG. 4, in a period from the end of bandwidth allocation of the variance-base bandwidth $B_{var}$ to the end of the DBA period, bandwidths b(1) to b(3) obtained by dividing the surplus bandwidth $B_{surplus}$ are allocated to ONU #1 to ONU #3, respectively.

Here, the order of performing bandwidth allocation to the terminating apparatuses 2 according to Equations (2) to (4) may not be the same. The bandwidth allocation amount calculation unit 17 performs bandwidth allocation based on the average value µ of the traffic amount calculated for each terminating apparatus 2 and performs bandwidth allocation based on the standard deviation σ of the traffic amount calculated for each terminating apparatus 2. The terminal station apparatus 1 performs these allocation operations sequentially whereby a waiting period (communication delay) until each terminating apparatus 2 obtains a communication chance can be reduced.

Second Embodiment

In the first embodiment, a surplus bandwidth which is not allocated to any terminating apparatus after the terminal station apparatus 1 allocates the average-base bandwidth and the variance-base bandwidth is distributed to respective terminating apparatuses. In the second embodiment, a surplus bandwidth or a variance-base allocation bandwidth and a surplus bandwidth is used in an activation window in which a signal for allowing a newly-connected terminating apparatus to send an authentication request to a terminal station apparatus is transmitted. In this manner, a terminal station apparatus of the second embodiment provides an activation window in only a period in which bandwidth is allocated according to Equation (3) or (4) described in the first embodiment whereby the influence of delay on already-connected terminating apparatuses can be suppressed.

The terminal station apparatus of the second embodiment calculates an average value and a standard deviation of the traffic amount on the basis of uplink traffic information and estimates a bandwidth allocation amount of each terminating apparatus using the average value and the standard deviation. Therefore, a bandwidth allocated on the basis of the surplus bandwidth $B_{surplus}$ calculated by Equation (4) is a bandwidth which is not used basically. Due to this, even if an activation window is provided in this period, there is no influence of delay on a mobile system.

Figure 5:
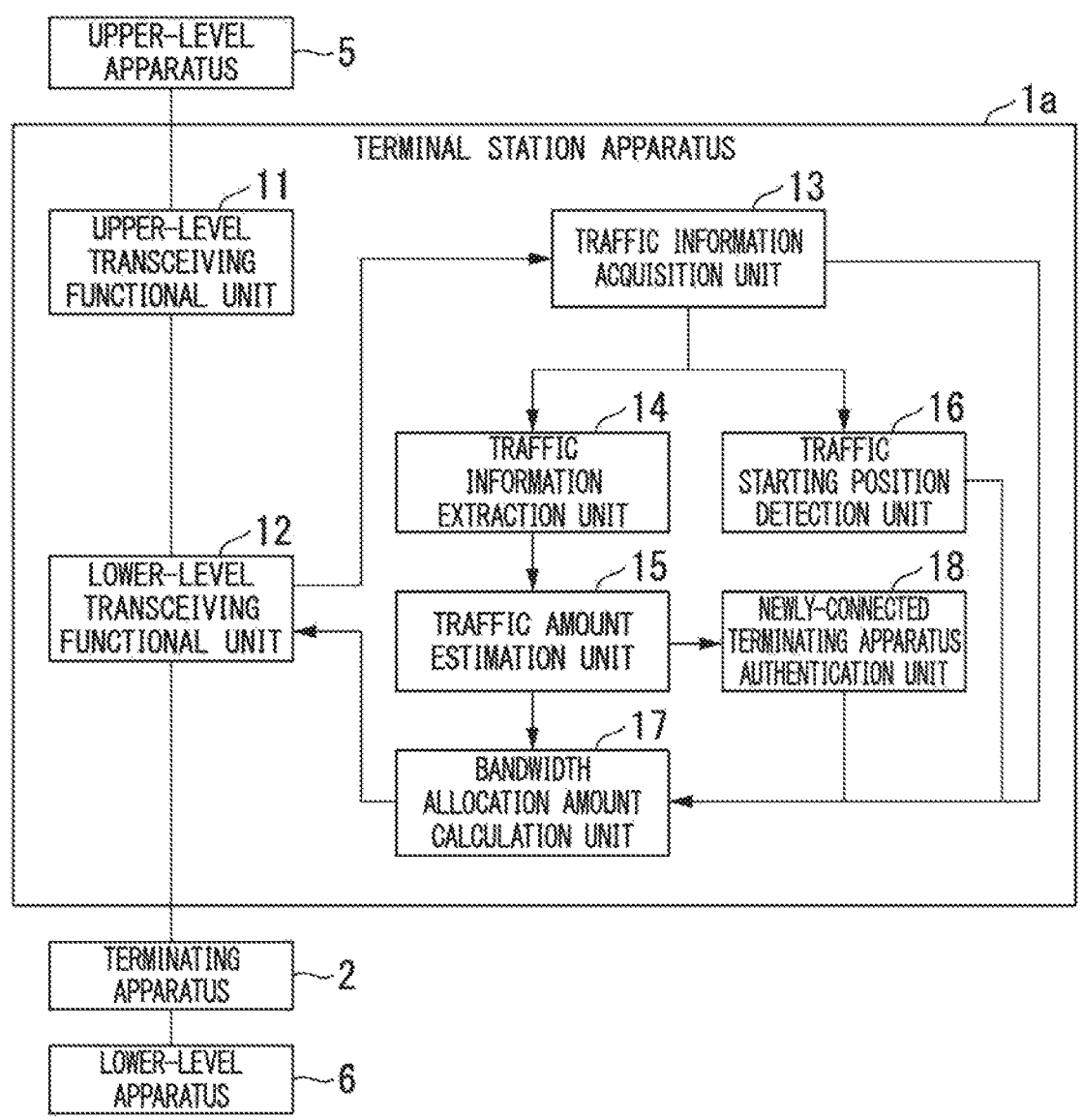
FIG. 5 is a functional block diagram illustrating a configuration of a terminal station apparatus according to a second embodiment.

FIG. 5 is a block diagram illustrating a configuration of a terminal station apparatus 1a according to the second embodiment. In FIG. 5, the same portions as those of the terminal station apparatus 1 according to the first embodiment illustrated in FIG. 2 will be denoted by the same reference numerals and the description thereof will be omitted. A difference between the terminal station apparatus 1 illustrated in FIG. 5 and the terminal station apparatus 1 of the first embodiment is that the terminal station apparatus 1 illustrated in FIG. 5 further includes a newly-connected terminating apparatus authentication unit 18. The newly-connected terminating apparatus authentication unit 18 acquires a period in which bandwidth allocation using Equation (4) described in the first embodiment is performed from the traffic amount estimation unit 15 or the bandwidth allocation amount calculation unit 17. The newly-connected terminating apparatus authentication unit 18 notifies the bandwidth allocation amount calculation unit 17 that an activation window is provided in this period only. The bandwidth allocation amount calculation unit 17 provides an activation window such that bandwidth is not allocated to the terminating apparatus 2 in the period notified from the newly-connected terminating apparatus authentication unit 18 within the period in which the bandwidth allocation of Equation (4) described in the first embodiment is performed.

The newly-connected terminating apparatus authentication unit 18 may further acquire a period in which bandwidth allocation using Equation (3) is performed and notify the bandwidth allocation amount calculation unit 17 that an activation window is provided in this period. The bandwidth allocation amount calculation unit 17 provides an activation window in the period such that bandwidth is not allocated to the terminating apparatus 2 in the period notified from the newly-connected terminating apparatus authentication unit 18 within the period in which bandwidth allocation of Equation (3) described in the first embodiment is performed.

The terminal station apparatus 1a provides an activation window in a period in which the possibility that each terminating apparatus 2 transmits an uplink signal is low. By providing an activation window in this manner, the possibility that a signal related to authentication of a newly-connected terminating apparatus interferes with an uplink signal of each terminating apparatus 2 can be suppressed and delay of transmission of an uplink signal can be suppressed.

Third Embodiment

In a third embodiment, a terminal station apparatus corrects a bandwidth allocation amount when traffic which significantly exceeds an estimation result occurs from a terminating apparatus.

Figure 6:
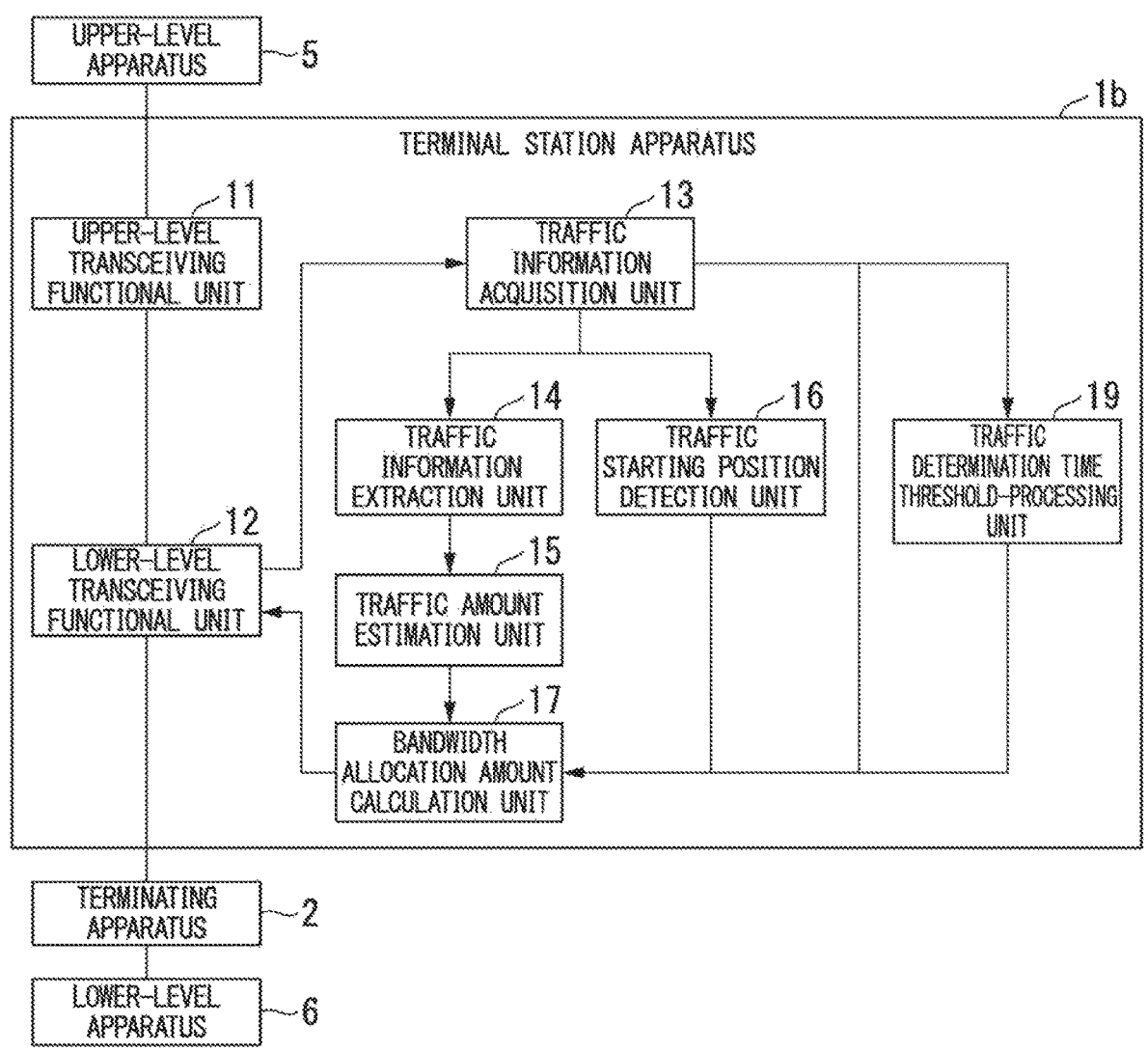
FIG. 6 is a functional block diagram illustrating a configuration of a terminal station apparatus according to a third embodiment.

FIG. 6 is a block diagram illustrating a configuration of a terminal station apparatus 1b according to a third embodiment. In FIG. 6, the same portions as those of the terminal station apparatus 1 according to the first embodiment illustrated in FIG. 2 will be denoted by the same reference numerals and the description thereof will be omitted. A difference between the terminal station apparatus 1b illustrated in FIG. 6 and the terminal station apparatus 1 of the first embodiment is that the terminal station apparatus 1b further includes a traffic determination time threshold-processing unit 19.

An arbitrary time threshold $t_{th}$ is set in the traffic determination time threshold-processing unit 19. When the terminal station apparatus 1 receives an uplink signal transmitted by the bandwidth allocation performed on the basis of Equation (3), the traffic information acquisition unit 13 notifies the traffic determination time threshold-processing unit 19 of a data amount of the uplink signal. The traffic determination time threshold-processing unit 19 compares the data amount of the uplink signal with the time threshold $t_{th}$ and instructs the bandwidth allocation amount calculation unit 17 to reset to fixed bandwidth allocation when it is determined that the data amount of the uplink signal exceeds the time threshold $t_{th}$. For example, when the traffic information acquisition unit 13 monitors traffic at a predetermined monitor period, the traffic determination time threshold-processing unit 19 can compare the time threshold with the data amount of the uplink signal expressed by the number of monitor periods. Alternatively, the traffic determination time threshold-processing unit 19 may convert the data amount of the uplink signal notified from the traffic information acquisition unit 13 to a reception time of the uplink signal and compare the reception time with the time threshold $t_{th}$. Alternatively, the traffic determination time threshold-processing unit 19 may convert the time threshold $t_{th}$ to a data amount receivable in the same period as the time threshold $t_{th}$ and compare the receivable data amount with the data amount of the uplink signal notified from the traffic information acquisition unit 13.

Upon receiving this instruction from the traffic determination time threshold-processing unit 19, the bandwidth allocation amount calculation unit 17 performs fixed bandwidth allocation to each terminating apparatus 2. In this way, the processes starting from step S105 in FIG. 3 are performed, and bandwidth allocation to each terminating apparatus 2 is performed again. By performing bandwidth allocation, the terminal station apparatus 1b can perform bandwidth allocation according to a change in the traffic amount of the uplink signal of each terminating apparatus 2 and suppress delay of transmission of the uplink signal.

Fourth Embodiment

In a fourth embodiment, unlike the second embodiment, a terminal station apparatus receives an uplink signal transmitted according to bandwidth allocation performed on the basis of Equation (4). The terminal station apparatus of the first embodiment calculates an average value and a standard deviation of the traffic amount on the basis of the uplink traffic information and estimates a bandwidth allocation amount on the basis of the average value and the standard deviation. Therefore, a bandwidth allocated on the basis of Equation (4) is a bandwidth which is not used basically. Due to this, the fact that an uplink signal is transmitted using the bandwidth allocation based on Equation (4) corresponds to a case in which traffic which significantly exceeds an estimation result occurs. The terminal station apparatus of the fourth embodiment starts the processes starting from step S105 in FIG. 3 and resets to the fixed bandwidth allocation and performs re-estimation when an uplink signal transmitted from a terminating apparatus is received in the bandwidth allocation performed on the basis of Equation (4).

The terminal station apparatus of the fourth embodiment can perform bandwidth allocation according to a change in the traffic amount of the uplink signal of each terminating apparatus 2 and suppress delay of transmission of the uplink signal similarly to the terminal station apparatus 1b of the third embodiment.

Fifth Embodiment

In the first to fourth embodiments, the terminal station apparatus acquires traffic of an uplink signal to estimate traffic information and performs bandwidth allocation on the basis of the traffic information. A terminal station apparatus of a fifth embodiment may acquire downlink traffic only or both uplink traffic and downlink traffic instead of uplink traffic and perform processes similar to those of the first to fourth embodiments using the acquired traffic information. When the traffic amount of an uplink signal and the traffic amount of a downlink signal are proportional to each other, the terminal station apparatus of the fifth embodiment can perform bandwidth allocation that suppresses delay similarly to the terminal station apparatuses of the first to fourth embodiments.

Sixth Embodiment

When a relay transmission system accommodates a plurality of RRHs, a terminal station apparatus can enhance a bandwidth-reducing effect by estimating a traffic amount of each terminating apparatus connected to RRHs and performing the processes of the first to fifth embodiments. Moreover, since the start of TTI is different depending on RRH, this can be coped with by extracting information individually. A terminal station apparatus can reduce delay from RRH (lower-level apparatus) to BBU (upper-level apparatus) by performing bandwidth allocation in synchronization with a TTI period of each RRH.

Seventh Embodiment

A seventh embodiment is different from the first embodiment in terms of a method of calculating an average-base bandwidth allocation amount and a variance-base bandwidth allocation amount.

Figure 7:
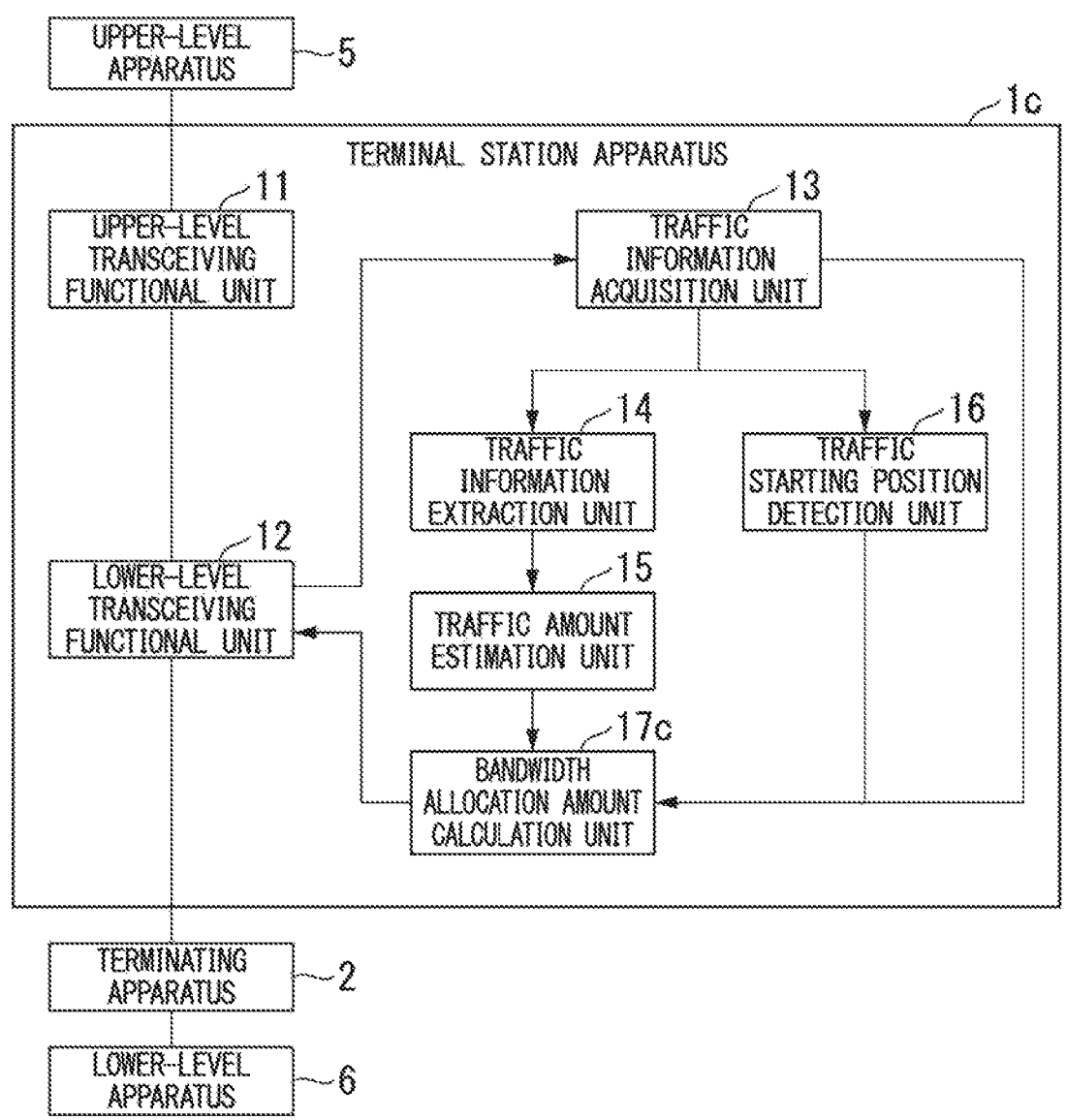
FIG. 7 is a functional block diagram illustrating a configuration of a terminal station apparatus according to a seventh embodiment.

FIG. 7 is a block diagram illustrating a configuration of a terminal station apparatus 1c of the seventh embodiment. In FIG. 7, the same portions as those of the terminal station apparatus 1 of the first embodiment illustrated in FIG. 2 will be denoted by the same reference numerals and the description thereof will be omitted. The terminal station apparatus 1c illustrated in FIG. 7 is different from the terminal station apparatus 1 of the first embodiment in that the terminal station apparatus 1c includes a bandwidth allocation amount calculation unit 17c instead of the bandwidth allocation amount calculation unit 17. The operation of the bandwidth allocation amount calculation unit 17c will be described with reference to the flowchart illustrated in FIG. 8.

Figure 8:
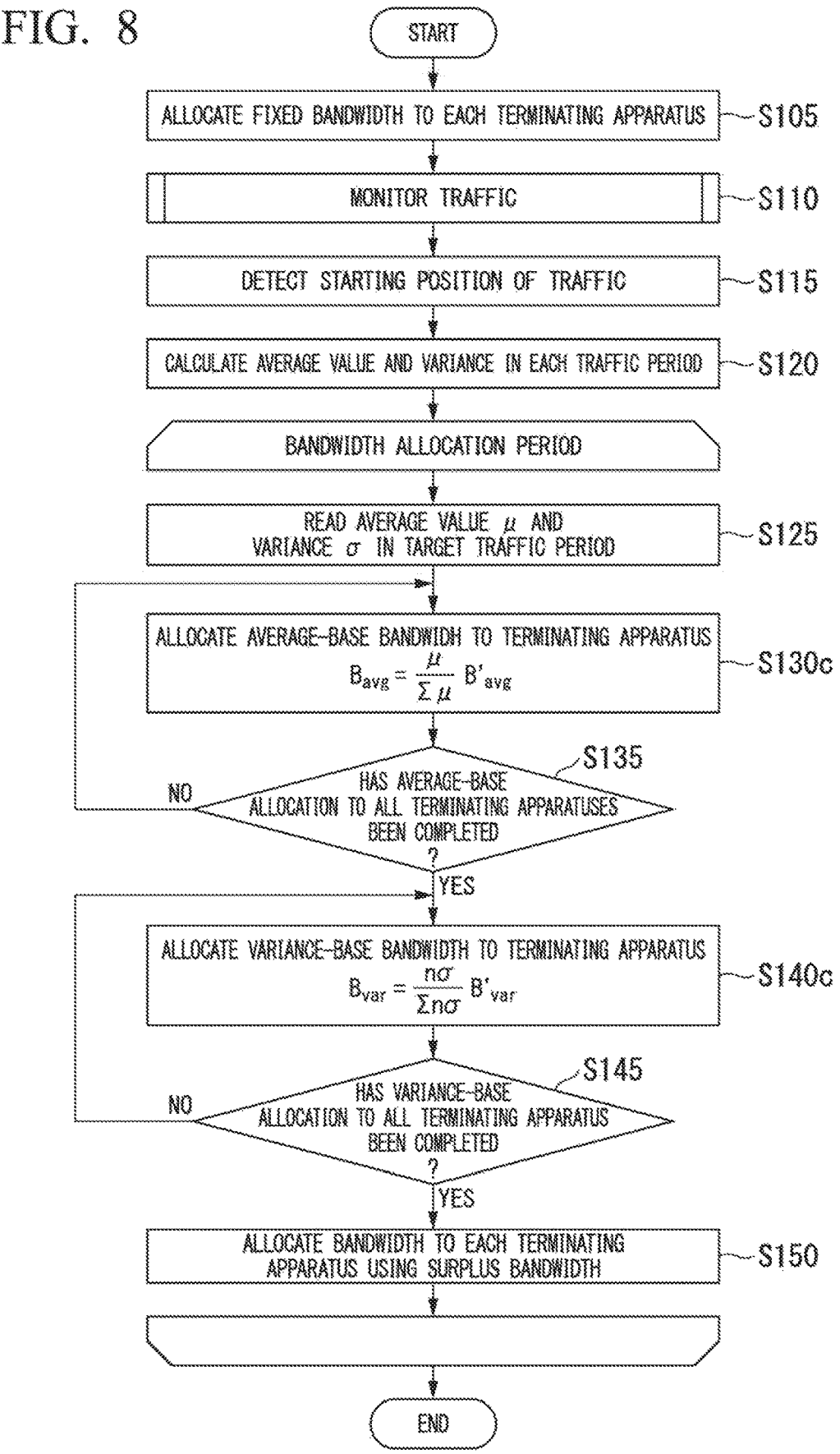
FIG. 8 is a flowchart illustrating a bandwidth allocation process of the terminal station apparatus according to the seventh embodiment.

FIG. 8 is a flowchart illustrating the operation of the terminal station apparatus 1c. In FIG. 8, the same processes as those of the processes performed by the terminal station apparatus 1 of the first embodiment illustrated in FIG. 3 will be denoted by the same reference numerals and the detailed description thereof will be omitted. The terminal station apparatus 1c performs the processes of steps S105 to S120 similarly to the terminal station apparatus 1 of the first embodiment.

The bandwidth allocation amount calculation unit 17c performs the following processes of steps S125 to S150 in each bandwidth allocation period.

In a bandwidth allocation period, the bandwidth allocation amount calculation unit 17c reads an average value µ and a standard deviation σ of the traffic amount of each terminating apparatus 2 in a traffic period corresponding to a target bandwidth allocation period in which bandwidth allocation is performed from the traffic amount estimation unit 15 (step S125). The bandwidth allocation amount calculation unit 17c allocates a bandwidth $B_{avg}(i)$ precedently to each terminating apparatus 2 as illustrated in Equation (5) (step S130c).

[Math. 5]

$$B_{avg}^{(i)} = \frac{\mu^{(i)}}{\sum_k \mu^{(k)}} B'^{(i)}_{avg} \qquad (5)$$

Unlike the first embodiment, the bandwidth allocation amount calculation unit 17c performs bandwidth allocation on the basis of the ratio obtained by dividing the average value µ of the traffic amount of a bandwidth allocation target-terminating apparatus 2 by the sum of all average values of the traffic amount calculated for the respective terminating apparatuses 2. Here, $B'^{(i)}_{avg}$ is an arbitrary bandwidth allocation amount for an $i^{th}$ terminating apparatus 2 and may be the same for all terminating apparatuses 2 and may be different for some or all terminating apparatuses 2.

When allocation of the average-base bandwidth $B_{avg}$ based on Equation (5) to all terminating apparatuses 2 is completed (step S135), the bandwidth allocation amount calculation unit 17c allocates the variance-base bandwidth $B_{var}$ which uses the standard deviation σ of the traffic amount as illustrated in Equation (6) sequentially to the respective terminating apparatuses 2 (step S140c).

[Math. 6]

$$B_{var}^{(i)} = \frac{n^{(i)} \sigma^{(i)}}{\sum_k n^{(k)} \sigma^{(k)}} B'^{(i)}_{var} \qquad (6)$$

In the variance-base bandwidth $B_{var}$, the bandwidth allocation amount calculation unit 17c performs bandwidth allocation on the basis of the ratio obtained by dividing the standard deviation σ of the traffic amount of a bandwidth allocation target-terminating apparatus 2 by the sum of all standard deviations of the traffic amount calculated for the respective terminating apparatuses 2 similarly to the bandwidth allocation based on Equation (5). Here, $B'^{(i)}_{var}$ is an arbitrary bandwidth allocation amount for an $i^{th}$ terminating apparatus 2 and may be the same for all terminating apparatuses 2 and may be different for some or all terminating apparatuses 2.

After allocation of the $B_{var}$ based on Equation (6) to all terminating apparatuses 2 is completed (step S145), the bandwidth allocation amount calculation unit 17c distributes and allocates the surplus bandwidth $B_{surplus}$ calculated on the basis of Equation (4) to the respective terminating apparatuses 2 similarly to the first embodiment (step S150). In allocation of the surplus bandwidth $B_{surplus}$, a fixed bandwidth may be allocated equally to each terminating apparatus 2, and a bandwidth allocation amount may be changed for respective terminating apparatuses 2 depending on a type such as priority. The surplus bandwidth $B_{surplus}$ may be used as a bandwidth for accommodating other services in addition to being allocated to each terminating apparatus 2. In the surplus bandwidth $B_{surplus}$ period, the terminal station apparatus 1c and each terminating apparatus 2 may perform a sleep operation. Here, the order of performing bandwidth allocation to the terminating apparatuses 2 according to Equations (4) to (6) may not be the same.

The seventh embodiment may be used together with the first embodiment. That is, bandwidth allocation based on an average value may follow the allocation according to the first embodiment, and the bandwidth allocation based on a standard deviation may follow the allocation according to the seventh embodiment. Alternatively, or conversely, the bandwidth allocation based on an average value may follow the allocation according to the seventh embodiment, and the bandwidth allocation based on a standard deviation may follow the allocation according to the first embodiment. A terminal station apparatus may perform bandwidth allocation according to this combination. The terminal station apparatus 1c sequentially performs two allocation operations of the bandwidth allocation based on the average value p of the traffic amount calculated for each terminating apparatus 2 and the bandwidth allocation based on the standard deviation σ of the traffic amount calculated for each terminating apparatus 2. With this allocation, similarly to the first embodiment, a waiting period (communication delay) until each terminating apparatus 2 obtains a communication chance can be reduced.

Eighth Embodiment

Figure 9:
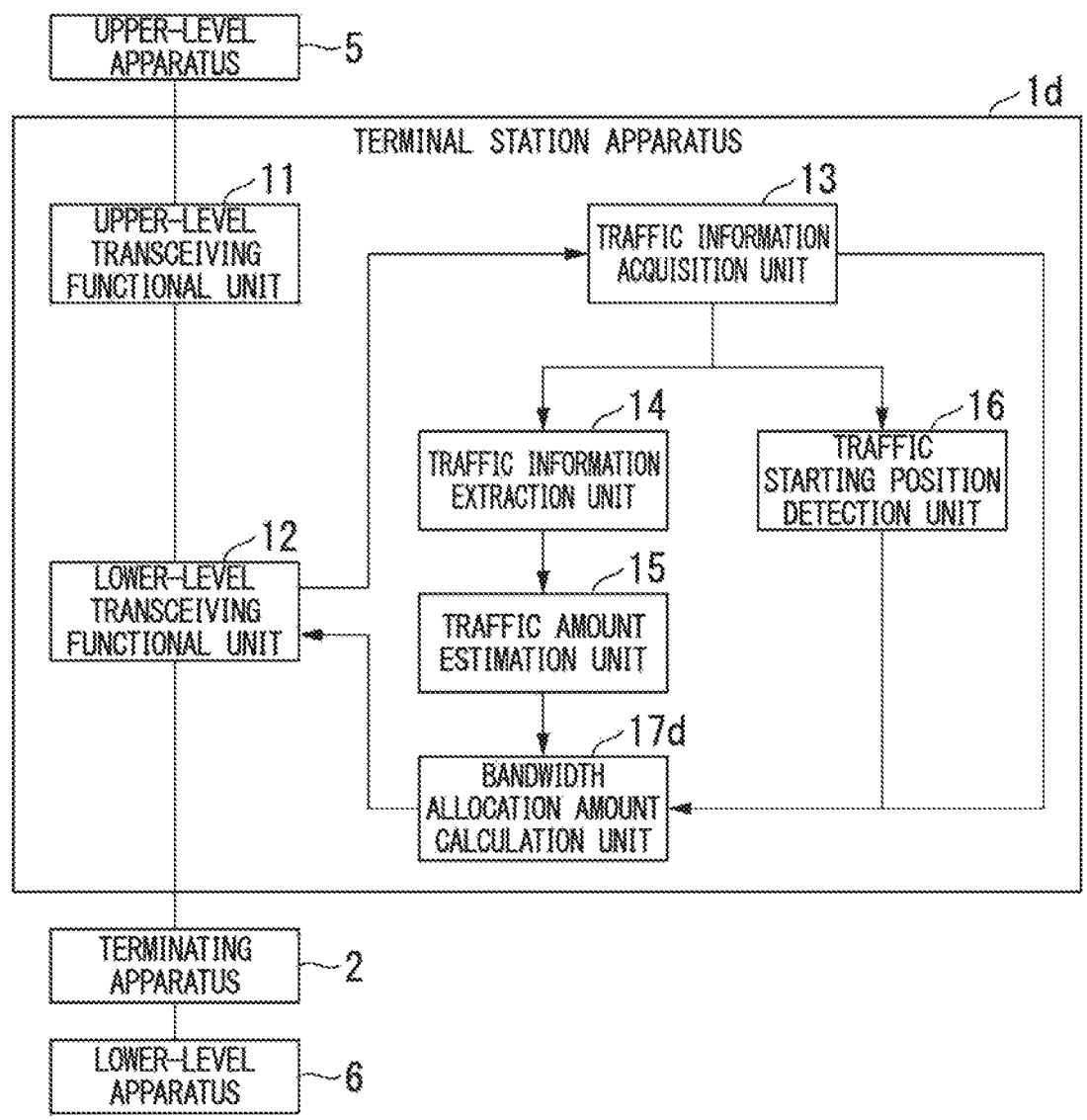
FIG. 9 is a functional block diagram illustrating a configuration of a terminal station apparatus according to an eighth embodiment.

An eighth embodiment is different from the first to seventh embodiments in terms of a bandwidth allocation amount calculation method. FIG. 9 is a functional block diagram illustrating a configuration of a terminal station apparatus 1d according to the eighth embodiment. In FIG. 9, the same portions as those of the terminal station apparatus 1 according to the first embodiment illustrated in FIG. 2 will be denoted by the same reference numerals and the description thereof will be omitted. A difference between the terminal station apparatus 1d illustrated in FIG. 9 and the terminal station apparatus 1 of the first embodiment is that the terminal station apparatus 1d includes a bandwidth allocation amount calculation unit 17d instead of the bandwidth allocation amount calculation unit 17. The operation of the bandwidth allocation amount calculation unit 17d will be described with reference to the flowchart illustrated in FIG. 10.

Figure 10:
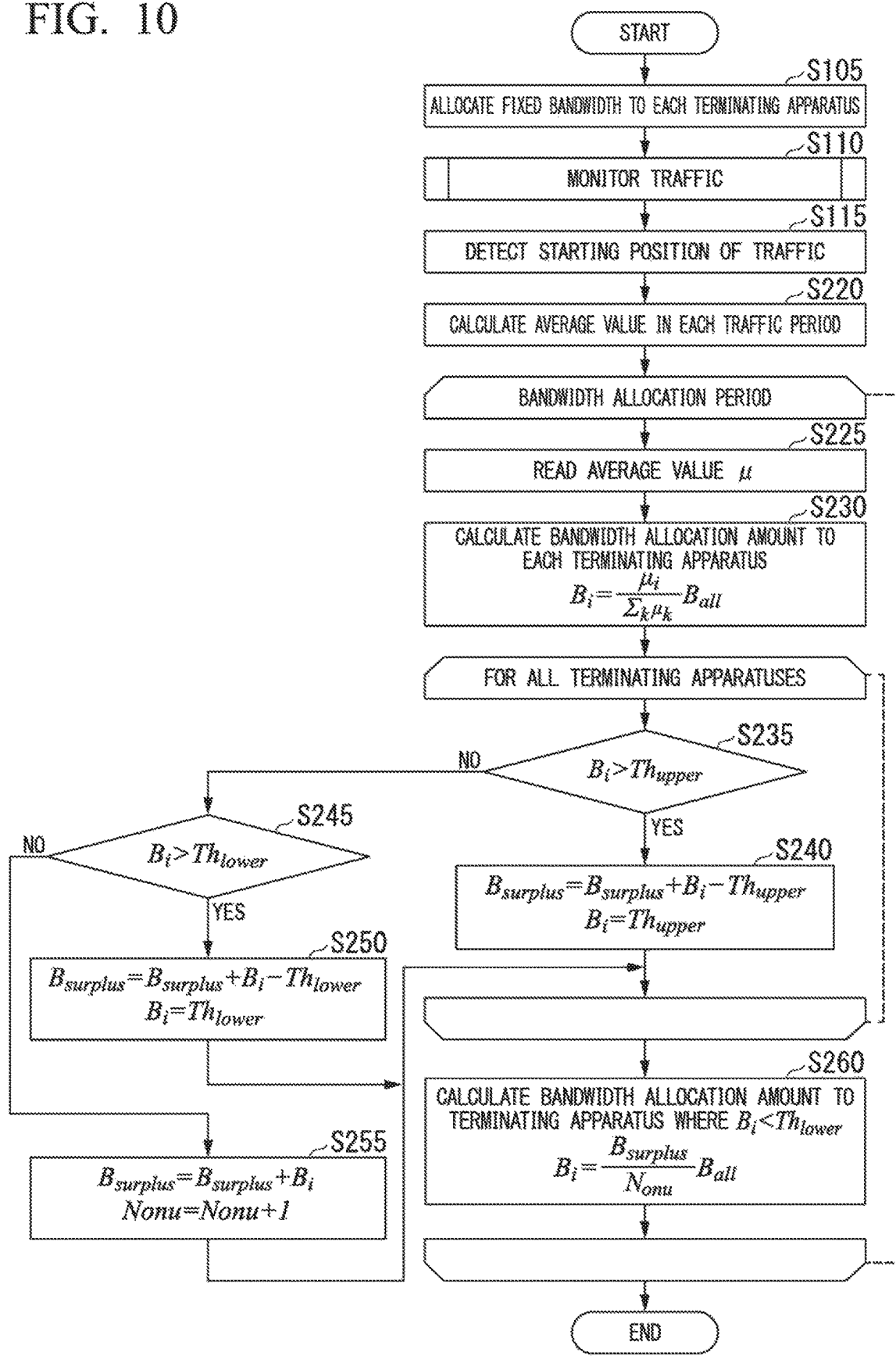
FIG. 10 is a flowchart illustrating a bandwidth allocation process of the terminal station apparatus according to the eighth embodiment.
Figure 11:
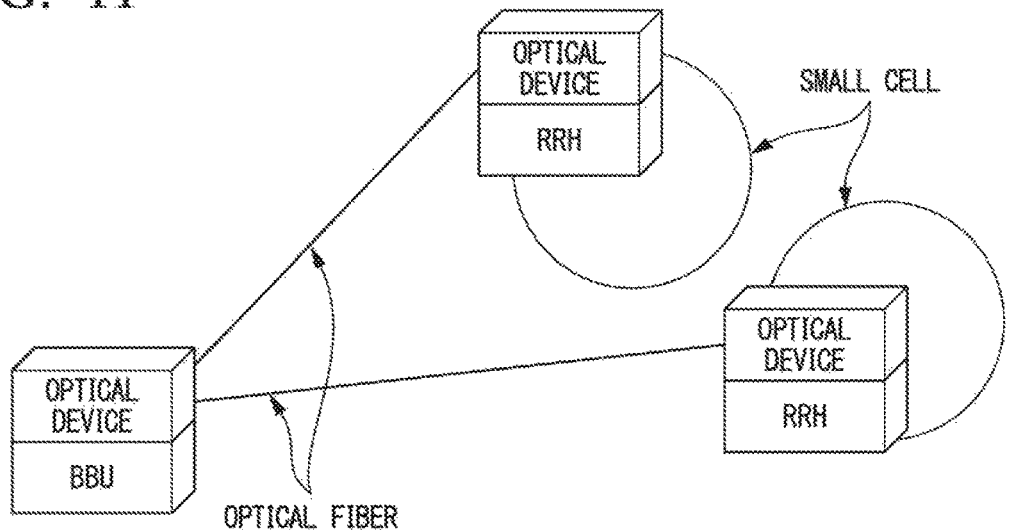
FIG. 11 is a diagram illustrating a configuration example of an MFH according to a conventional technology.

FIG. 10 is a flowchart illustrating the operation of the terminal station apparatus 1d. In FIG. 10, the same processes as the processes performed by the terminal station apparatus 1 of the first embodiment illustrated in FIG. 3 will be denoted by the same reference numerals, and the detailed description thereof will be omitted. The terminal station apparatus 1d performs the processes of steps S105 to S115 similarly to the terminal station apparatus 1.

The traffic amount estimation unit 15 calculates the average value μ of the traffic amount on the basis of the traffic information extracted by the traffic information extraction unit 14 for each terminating apparatus 2 (step S220). The traffic amount estimation unit 15 may calculate the average value μ using the traffic amount in a predetermined number of previous traffic periods for each terminating apparatus 2.

The bandwidth allocation amount calculation unit 17d performs the following processes of steps S225 to S260 in each bandwidth allocation period.

The bandwidth allocation amount calculation unit 17d reads an average value $\mu_i$ of the traffic amount of each terminating apparatus 2 from the traffic amount estimation unit 15 (step S225). The bandwidth allocation amount calculation unit 17d calculates a bandwidth $B_i$ based on the ratio of the average value pi of each terminating apparatus 2 to the sum of the average values $\mu_i$ of the terminating apparatuses 2 as illustrated in Equation (7) as a bandwidth allocation amount to each terminating apparatus 2 (step S230). As illustrated in Equation (7), the bandwidth allocation amount calculation unit 17d calculates a bandwidth $B_i$ in which all bandwidth usable in the DBA period are allocated to the respective terminating apparatuses 2. The bandwidth $B_i$ is calculated by multiplying the bandwidth $B_{all}$ by the ratio of the average value $\mu_i$ of each terminating apparatus 2 to the sum of the average values $\mu_i$. When the bandwidth allocation amount is calculated in step S230, the surplus bandwidth $B_{surplus}$ is initialized to zero.

[Math. 7]

$$B_i = \frac{\mu_i}{\sum_k \mu_k} B_{all} \quad (7)$$

The bandwidth allocation amount calculation unit 17d performs the processes of steps S235 to S255 for each of the terminating apparatuses 2 connected to the terminal station apparatus 1d.

The bandwidth allocation amount calculation unit 17d determines whether the bandwidth $B_i$ allocated to the $i^{th}$ terminating apparatus 2 among all terminating apparatuses 2 is larger than a predetermined threshold $Th_{upper}$ (step S235). When the bandwidth $B_i$ is larger than the threshold $Th_{upper}$ (step S235: YES), the bandwidth allocation amount calculation unit 17d changes the bandwidth $B_i$ allocated to the $i^{th}$ terminating apparatus 2 to the threshold $Th_{upper}$ and adds a difference bandwidth $(B_i - Th_{upper})$ to the surplus bandwidth $B_{surplus}$ (step S240).

When the bandwidth $B_i$ is equal to or smaller than the threshold $Th_{upper}$ (step S235: NO), the bandwidth allocation amount calculation unit 17d determines whether the bandwidth $B_i$ is larger than a predetermined threshold $Th_{lower}$ (step S245). The threshold $Th_{lower}$ is smaller than the threshold $Th_{upper}$. When the bandwidth $B_i$ is larger than the threshold $Th_{lower}$ (step S245: YES), the bandwidth allocation amount calculation unit 17d changes the bandwidth $B_i$ allocated to the $i^{th}$ terminating apparatus 2 to the threshold $Th_{lower}$ and adds a difference bandwidth $(B_i - Th_{lower})$ to the surplus bandwidth $B_{surplus}$ (step S250).

When the bandwidth $B_i$ is equal to or smaller than the threshold $Th_{lower}$ (step S245: NO), the bandwidth allocation amount calculation unit 17d increases $N_{onu}$ indicating the number of terminating apparatuses 2 in which the bandwidth $B_i$ is equal to or smaller than the threshold $Th_{lower}$ by 1 and adds the bandwidth $B_i$ to the surplus bandwidth $B_{surplus}$ (step S255).

The bandwidth allocation amount calculation unit 17d changes the bandwidth $B_i$ allocated to each of $N_{onu}$ terminating apparatuses 2 in which the bandwidth $B_i$ is equal to or smaller than the threshold $Th_{lower}$ to a bandwidth $B_i$ $(=(B_{surplus}/N_{onu}))$ obtained by evenly dividing the surplus bandwidth $B_{surplus}$ (step S260). That is, the bandwidth allocation amount calculation unit 17d evenly distributes the surplus bandwidth $B_{surplus}$ which is a non-allocated bandwidth other than the bandwidth allocated to terminating apparatuses 2 in which the bandwidth $B_i$ exceeds the threshold $Th_{upper}$ or $Th_{lower}$. The bandwidth allocation amount calculation unit 17d allocates the bandwidth $B_i$ corresponding to each of the terminating apparatuses 2 as a bandwidth allocation amount sequentially from the start of the bandwidth allocation period.

After temporary allocation based on the average value p of the traffic amount of each terminating apparatus 2 is performed, the terminal station apparatus 1d adjusts the bandwidth allocated to each terminating apparatus 2 on the basis of the two thresholds $Th_{upper}$ and $Th_{lower}$. By suppressing the allocation bandwidth exceeding the threshold $Th_{upper}$ to the threshold $Th_{upper}$, it is possible to suppress biased allocation of bandwidth to partial terminating apparatuses 2. Therefore, the terminal station apparatus 1d can reduce a waiting period (communication delay) until each terminating apparatus 2 obtains a communication chance.

Although a case in which all usable bandwidth $B_{all}$ are proportionally distributed to respective terminating apparatuses 2 on the basis of the average value μ in step S230 has been described, the average value $\mu_i$ of each terminating apparatus 2 may be used as the allocation bandwidth $B_i$. The bandwidth allocation amount calculation unit 17d may adjust the allocation bandwidth using one or three or more thresholds. For example, when the bandwidth allocation is adjusted using one threshold, the bandwidth allocation amount calculation unit 17 performs the process of step S255 when the bandwidth $B_i$ is equal to or smaller than the threshold $Th_{upper}$ (step S235: NO).

Ninth Embodiment

In the eighth embodiment, the terminal station apparatus 1d acquires the traffic of an uplink signal to estimate traffic information and performs bandwidth allocation on the basis of the traffic information. A terminal station apparatus of a ninth embodiment may acquire downlink traffic only or both uplink traffic and downlink traffic instead of the uplink traffic and perform the processes similar to those of the eighth embodiment using the acquired traffic information. When the traffic amount of an uplink signal and the traffic amount of a downlink signal are proportional to each other, the terminal station apparatus of the ninth embodiment can perform bandwidth allocation that suppresses delay similarly to the terminal station apparatus of the eighth embodiment.

Tenth Embodiment

When a relay transmission system accommodates a plurality of RRHs, the terminal station apparatus 1d of the eighth embodiment can enhance a bandwidth-reducing effect by estimating a traffic amount of each terminating apparatus 2 connected to RRHs and performing bandwidth allocation on each terminating apparatus 2. Moreover, since the start of TTI is different depending on RRH, this can be coped with by extracting information individually. A terminal station apparatus can reduce delay from RRH (lower-level apparatus) to BBU (upper-level apparatus) by performing bandwidth allocation in synchronization with a TTI period of each RRH.

According to the above-described embodiments, a bandwidth allocation apparatus includes a traffic information acquisition unit, a traffic starting position detection unit, a traffic information extraction unit, a traffic amount estimation unit, and a bandwidth allocation unit. Although the bandwidth allocation apparatus is a terminal station apparatus 1, 1a, 1b, or 1c, the bandwidth allocation apparatus may be an external apparatus connected to a terminal station apparatus, and the bandwidth allocation apparatus may be realized by a terminal station apparatus and an external apparatus.

The traffic information acquisition unit acquires traffic information indicating a traffic amount of communication that each lower-level apparatus performs via a terminating apparatus for each lower-level apparatus connected to the terminating apparatus. The traffic starting position detection unit detects a start timing of burst traffic on the basis of the traffic information. The traffic information extraction unit extracts information on a traffic amount of each of a plurality of traffic allocation periods from the traffic information collected for each lower-level apparatus. The traffic amount estimation unit calculates an average value and a standard deviation of the traffic amount in the traffic allocation periods on the basis of the information on the traffic amount extracted by the traffic information extraction unit for each lower-level apparatus.

The bandwidth allocation unit is the bandwidth allocation amount calculation unit 17, for example. The bandwidth allocation unit regards the start timing detected by the traffic starting position detection unit as the start timing of the bandwidth allocation period and allocates a first bandwidth which is an allocation bandwidth based on the average value of the traffic amount to the terminating apparatus from the start of the bandwidth allocation period. The first bandwidth is calculated according to Equation (2), for example. The bandwidth allocation unit allocates a second bandwidth which is an allocation bandwidth based on the standard deviation of the traffic amount to the terminating apparatus after allocation of the first bandwidth to all terminating apparatuses is completed. The second bandwidth is calculated according to Equation (3), for example. The bandwidth allocation unit distributes and allocates a surplus bandwidth which is the first and second bandwidth which are already allocated, subtracted from a bandwidth allocatable in the bandwidth allocation period to each terminating apparatus in a surplus bandwidth allocation period which is a period from the end of allocation of the second bandwidth to all terminating apparatuses to the end of the bandwidth allocation period.

The bandwidth allocation unit may calculate the first bandwidth according to the ratio of the average value of the traffic amount in a bandwidth allocation target-terminating apparatus to the sum of average values of the traffic amount in all terminating apparatuses as illustrated in Equation (5). Moreover, the bandwidth allocation unit may calculate the second bandwidth according to the ratio of the standard deviation of the traffic amount in the bandwidth allocation target-terminating apparatus to the sum of the standard deviations of the traffic amount in all terminating apparatuses as illustrated in Equation (6).

The bandwidth allocation apparatus may further include a newly-connected terminating apparatus authentication unit that sets an authentication period for detecting a newly-connected terminating apparatus in a surplus bandwidth allocation period. The bandwidth allocation unit does not allocate a bandwidth to the terminating apparatus in the authentication period notified from the newly-connected terminating apparatus authentication unit.

Moreover, the bandwidth allocation apparatus may further include a traffic excess determination-processing unit. The traffic excess determination-processing unit is the traffic determination time threshold-processing unit 19, for example. The traffic excess determination-processing unit determines that the traffic amount is abnormally excessive when the traffic amount of an uplink signal transmitted from the terminating apparatus using the second bandwidth exceeds a threshold and instructs the bandwidth allocation unit to perform bandwidth allocation again. Alternatively, when an uplink signal which uses a surplus bandwidth is transmitted from the terminating apparatus, the traffic excess determination-processing unit determines that the traffic amount is abnormally excessive and instructs the bandwidth allocation unit to perform bandwidth allocation again.

According to the above-described embodiments, when bandwidth is allocated to each terminating apparatus in the bandwidth allocation period, the period for the allocation based on an average value and the period for the allocation based on a standard deviation are separate. By performing bandwidth allocation performed on the basis of an average value precedently, it is possible to reduce the waiting period of each terminal station apparatus.

The function of the terminal station apparatuses 1, 1a, 1b, 1c, and 1d of the above-described embodiments may be realized by a computer. In this case, a program for realizing this function may be recorded on a computer-readable recording medium and the program recorded on the recording medium may be read and executed by a processor of a computer system whereby the function is realized. The "computer system" used herein includes an OS and hardware such as peripheral devices. Moreover, the "computer-readable recording medium" means a portable medium such as a flexible disk, a magneto-optical disk, ROM, or CD-ROM and a storage device built in the computer system, such as a hard disk. Furthermore, the "computer-readable recording medium" also encompasses one that dynamically retains the program for a short period of time, such as a communication wire in the case of transmission of the program via a network such as the Internet or a communication line such as a telephone line, and one that retains the program for a certain period of time, such as a volatile memory inside the computer system that serves as a server or a client in that case. Furthermore, the program may be one that achieves one or some of the aforementioned functions, or may be one that can achieve the aforementioned functions in combination with a program already stored in the computer system.

While embodiments of the present invention have been described with reference to the drawings, a specific structure is not limited to the embodiments but the present invention embraces design modifications made without departing from the spirit of the present invention.

INDUSTRIAL APPLICABILITY

The present invention can be applied to a system that performs communication by time-division multiple-access.

REFERENCE SIGNS LIST 1, 1a, 1b, 1c, 1d: Terminal station apparatus
2: Terminating apparatus
3: Optical splitter
5: Upper-level apparatus
6: Lower-level apparatus
8: Access network system
41, 42: Optical fiber
11: Upper-level transceiving functional unit
12: Lower-level transceiving functional unit
13: Traffic information acquisition unit
14: Traffic information extraction unit
15: Traffic amount estimation unit
16: Traffic starting position detection unit
17, 17c. 17d: Bandwidth allocation amount calculation unit
18: Newly-connected terminating apparatus authentication unit
19: Traffic determination time threshold-processing unit

The invention claimed is:

1. A bandwidth allocation apparatus, comprising:
a traffic information acquisitor configured to acquire traffic information indicating the traffic of communication that each lower-level apparatus performs via a respective terminating apparatus for each lower-level apparatus connected to the respective terminating apparatus;
a traffic starting position detector configured to detect a start timing of burst traffic that arrives at the respective terminating apparatus from each lower-level apparatus on a basis of the traffic information;
a traffic information extractor configured to extract information on a traffic amount of each of traffic allocation periods from the traffic information extracted for each lower-level apparatus;
a traffic amount estimator configured to calculate, for each lower-level apparatus, an average value of the traffic amount in the traffic allocation periods on a basis of the information on the traffic amount that the traffic information extractor has extracted; and
a bandwidth allocator configured to allocate a first bandwidth which is an allocation bandwidth based on the average value calculated by the traffic amount estimator to each terminating apparatus from a start of the bandwidth allocation period, the start timing detected by the traffic starting position detector being used as the start timing of the bandwidth allocation period
wherein each terminating apparatus is an optical network unit ONU,
each lower-level apparatus is a remote radio head RRH that is an antenna unit of a radio base station, and
each of the traffic information acquisitor, the traffic starting position detector, the traffic information extractor, the traffic amount estimator, and the bandwidth allocator is implemented by: i) computer executable instructions executed by at least one processor, ii) at least one circuit, or iii) a combination of computer executable instructions executed by at least one processor and at least one circuit.

2. The bandwidth allocation apparatus according to claim 1, wherein the traffic allocation periods are time segments obtained by dividing a time segment in which the traffic information has been acquired by the traffic information acquisitor.

3. The bandwidth allocation apparatus according to claim 1, wherein the bandwidth allocation period is a period in which the bandwidth allocation apparatus transmits a signal containing information to give uplink transmission permission to the respective terminating apparatus.

4. The bandwidth allocation apparatus according to claim 1, wherein the traffic allocation periods are time segments obtained by dividing a time segment in which the traffic information has been acquired by the traffic information acquisitor, and
the bandwidth allocation period is a period in which the bandwidth allocation apparatus transmits a signal containing information to give uplink transmission permission to the respective terminating apparatus.

5. The bandwidth allocation apparatus according to claim 1, wherein the traffic starting position detector is configured to detect the start timing of the burst traffic on the basis of the traffic information for each lower-level apparatus.

6. The bandwidth allocation apparatus according to claim 1, wherein the bandwidth allocator is configured to allocate the first bandwidth in synchronization with a time interval at which the burst traffic arrives at the respective terminating apparatus.

7. A bandwidth allocation apparatus, comprising:
a traffic information acquisitor configured to acquire traffic information indicating the traffic of communication that each lower-level apparatus performs via a respective terminating apparatus for each lower-level apparatus connected to the respective terminating apparatus;
a traffic starting position detector configured to detect a start timing of burst traffic that arrives at the respective terminating apparatus from each lower-level apparatus on a basis of the traffic information;
a traffic information extractor configured to extract information on a traffic amount of each of traffic allocation periods from the traffic information extracted for each lower-level apparatus;
a traffic amount estimator configured to calculate, for each lower-level apparatus, an average value of the traffic amount in the traffic allocation periods on a basis of the information on the traffic amount that the traffic information extractor has extracted; and a bandwidth allocator configured to allocate a first bandwidth which is an allocation bandwidth based on the average value calculated by the traffic amount estimator to each terminating apparatus from a start of the bandwidth allocation period, the start timing detected by the traffic starting position detector being used as the start timing of the bandwidth allocation period, wherein the traffic amount estimator is configured to calculate, for each lower-level apparatus, a standard deviation of the traffic amount in the traffic allocation periods on a basis of the information on the traffic amount extracted by the traffic information extractor, the bandwidth allocator is configured to allocate a second bandwidth which is an allocation bandwidth based on the standard deviation calculated by the traffic amount estimator to each terminating apparatus after the end of allocation of the first bandwidth and allocate a surplus bandwidth which is the first bandwidth and the second bandwidth subtracted from an allocatable bandwidth in the bandwidth allocation period to each terminating apparatus in a surplus bandwidth allocation period which is a period from the end of allocation of the second bandwidth to the end of the bandwidth allocation period, and each of the traffic information acquisitor, the traffic starting position detector, the traffic information extractor, the traffic amount estimator, and the bandwidth allocator is implemented by: i) computer executable instructions executed by at least one processor, ii) at least one circuit, or iii) a combination of computer executable instructions executed by at least one processor and at least one circuit.

8. The bandwidth allocation apparatus according to claim 7, wherein
the bandwidth allocator is configured to calculate the first bandwidth to be allocated to each terminating apparatus according to a ratio of the average value in a relevant terminating apparatus to a sum of the average values in all terminating apparatuses, and
the bandwidth allocator is configured to calculate the second bandwidth to be allocated to each terminating apparatus according to a ratio of the standard deviation in a relevant terminating apparatus to a sum of the standard deviations in all terminating apparatuses.

9. The bandwidth allocation apparatus according to claim 7, further comprising:
a newly-connected terminating apparatus authenticator configured to set an authentication period for detecting a newly-connected terminating apparatus in the surplus bandwidth allocation period, wherein
the bandwidth allocator is configured not to allocate a bandwidth to the terminating apparatus in the authentication period notified from the newly-connected terminating apparatus authenticator, and
the newly-connected terminating apparatus authenticator is implemented by: i) computer executable instructions executed by at least one processor, ii) at least one circuit, or iii) a combination of computer executable instructions executed by at least one processor and at least one circuit.

10. The bandwidth allocation apparatus according to claim 7, further comprising:
a traffic excess determination-processor configured to instruct the bandwidth allocator to perform bandwidth allocation again when a traffic amount of an uplink signal transmitted from the terminating apparatus using the second bandwidth exceeds a threshold
wherein the traffic excess determination-processor is implemented by: i) computer executable instructions executed by at least one processor, ii) at least one circuit, or iii) a combination of computer executable instructions executed by at least one processor and at least one circuit.

11. The bandwidth allocation apparatus according to claim 7, further comprising:
a traffic excess determination-processor configured to instruct the bandwidth allocator to perform bandwidth allocation again when an uplink signal which uses the surplus bandwidth is transmitted from the terminating apparatus
wherein the traffic excess determination-processor is implemented by: i) computer executable instructions executed by at least one processor, ii) at least one circuit, or iii) a combination of computer executable instructions executed by at least one processor and at least one circuit.

12. A bandwidth allocation apparatus, comprising:
a traffic information acquisitor configured to acquire traffic information indicating the traffic of communication that each lower-level apparatus performs via a respective terminating apparatus for each lower-level apparatus connected to the respective terminating apparatus;
a traffic starting position detector configured to detect a start timing of burst traffic that arrives at the respective terminating apparatus from each lower-level apparatus on a basis of the traffic information;
a traffic information extractor configured to extract information on a traffic amount of each of traffic allocation periods from the traffic information extracted for each lower-level apparatus;
a traffic amount estimator configured to calculate, for each lower-level apparatus, an average value of the traffic amount in the traffic allocation periods on a basis of the information on the traffic amount that the traffic information extractor has extracted; and
a bandwidth allocator configured to allocate a first bandwidth which is an allocation bandwidth based on the average value calculated by the traffic amount estimator to each terminating apparatus from a start of the bandwidth allocation period, the start timing detected by the traffic starting position detector being used as the start timing of the bandwidth allocation period,
wherein the bandwidth allocator is configured to calculate, for each lower-level apparatus, a bandwidth by multiplying a bandwidth allocatable to each lower-level apparatus by a ratio of the average value in a relevant lower-level apparatus to a sum of the average values calculated by the traffic amount estimator,
the bandwidth allocator is configured to allocate a bandwidth indicated by a first threshold to the lower-level apparatus in which the calculated bandwidth exceeds the first threshold and evenly distribute a non-allocated bandwidth within the allocatable bandwidth to the lower-level apparatus in which the calculated bandwidth is equal to or smaller that the first threshold, and
each of the traffic information acquisitor, the traffic starting position detector, the traffic information extractor, the traffic amount estimator, and the bandwidth allocator is implemented by: i) computer executable instructions executed by at least one processor, ii) at least one circuit, or iii) a combination of computer executable instructions executed by at least one processor and at least one circuit.

13. The bandwidth allocation apparatus according to claim 12, wherein
the bandwidth allocator is configured to allocate a bandwidth indicated by the first threshold to the lower-level apparatus in which the calculated bandwidth exceeds the first threshold, allocate a bandwidth indicated by a second threshold to the lower-level apparatus in which the calculated bandwidth is equal to or smaller than the first threshold and is equal to or larger than the second threshold, which is smaller than the first threshold, and allocate a non-allocated bandwidth within the allocatable bandwidth to the lower-level apparatus in which the calculated bandwidth is equal to or smaller than the second threshold.

14. A bandwidth allocation method performed by a bandwidth allocation apparatus, comprising:
a traffic information acquisition step of acquiring traffic information indicating the traffic of communication that each lower-level apparatus performs via a respective terminating apparatus for each lower-level apparatus connected to the respective terminating apparatus;
a traffic starting position detection step of detecting a start timing of burst traffic that arrives at the respective terminating apparatus from each lower-level apparatus on a basis of the traffic information;
a traffic information extraction step of extracting information on a traffic amount of each of traffic allocation periods from the traffic information extracted for each lower-level apparatus;
a traffic amount estimation step of calculating, for each lower-level apparatus, an average value of the traffic amount in the traffic allocation periods on a basis of the information on the traffic amount extracted; and
a bandwidth allocation step of allocating a first bandwidth which is an allocation bandwidth based on the calculated average value to each terminating apparatus from a start of the bandwidth allocation period, the detected start timing of the burst traffic being used as the start timing of the bandwidth allocation period,
wherein each terminating apparatus is an optical network unit ONU, and
each lower-level apparatus is a remote radio head RRH that is an antenna unit of a radio base station.

15. The bandwidth allocation method according to claim 14, wherein the traffic allocation periods are time segments obtained by dividing a time segment in which the traffic information ha been acquired by the traffic information acquisition step.

16. The bandwidth allocation method according to claim 14, wherein the bandwidth allocation period is a period in which the bandwidth allocation apparatus transmits a signal containing information to give uplink transmission permission to the respective terminating apparatus.

17. The bandwidth allocation method according to claim 14, wherein the traffic allocation periods are time segments obtained by dividing a time segment in which the traffic information has been acquired by the traffic information acquisition step, and
the bandwidth allocation period is a period is a period in which the bandwidth allocation apparatus transmits a signal containing information to give uplink transmission permission to the respective terminating apparatus.

18. The bandwidth allocation method according claim 14, wherein the traffic starting position detection step detects the start timing of the burst traffic on the basis of the traffic information for each lower-level apparatus.

19. The bandwidth allocation method according to claim 14, wherein the bandwidth allocation step allocates the first bandwidth in synchronization with a time interval at which the burst traffic arrives at the respective terminating apparatus.

20. A bandwidth allocation method performed by a bandwidth allocation apparatus, comprising:
a traffic information acquisition step of acquiring traffic information indicating the traffic of communication that each lower-level apparatus performs via a respective terminating apparatus for each lower-level apparatus connected to the respective terminating apparatus;
a traffic starting position detection step of detecting a start timing of burst traffic that arrives at the respective terminating apparatus from each lower-level apparatus on a basis of the traffic information;
a traffic information extraction step of extracting information on a traffic amount of each of traffic allocation periods from the traffic information extracted for each lower-level apparatus;
a traffic amount estimation step of calculating, for each lower-level apparatus, an average value of the traffic amount in the traffic allocation periods on a basis of the information on the traffic amount extracted; and
a bandwidth allocation step of allocating a first bandwidth which is an allocation bandwidth based on the calculated average value to each terminating apparatus from a start of the bandwidth allocation period, the detected start timing of the burst traffic being used as the start timing of the bandwidth allocation period,
wherein
the traffic amount estimation step calculates, for each lower-level apparatus, a standard deviation of the traffic amount in the traffic allocation periods on a basis of the information on the traffic amount extracted by the traffic information extraction step, and the bandwidth allocation step allocates a second bandwidth which is an allocation bandwidth based on the standard deviation calculated by the traffic amount estimation step to each terminating apparatus after the end of allocation of the first bandwidth and allocates a surplus bandwidth which is the first bandwidth and the second bandwidth subtracted from an allocatable bandwidth in the bandwidth allocation period to each terminating apparatus in a surplus bandwidth allocation period which is a period from the end of allocation of the second bandwidth to the end of the bandwidth allocation period.

21. A bandwidth allocation method performed by a bandwidth allocation apparatus, comprising:
a traffic information acquisition step of acquiring traffic information indicating the traffic of communication that each lower-level apparatus performs via a respective terminating apparatus for each lower-level apparatus connected to the respective terminating apparatus;
a traffic starting position detection step of detecting a start timing of burst traffic that arrives at the respective terminating apparatus from each lower-level apparatus on a basis of the traffic information;
a traffic information extraction step of extracting information on a traffic amount of each of traffic allocation periods from the traffic information extracted for each lower-level apparatus;
a traffic amount estimation step of calculating, for each lower-level apparatus, an average value of the traffic amount in the traffic allocation periods on a basis of the information on the traffic amount extracted; and a bandwidth allocation step of allocating a first bandwidth which is an allocation bandwidth based on the calculated average value to each terminating apparatus from a start of the bandwidth allocation period, the detected start timing of the burst traffic being used as the start timing of the bandwidth allocation period, wherein the bandwidth allocation step calculates, for each lower-level apparatus, a bandwidth by multiplying a bandwidth allocatable to each lower-level apparatus by a ratio of the average value in a relevant lower-level apparatus to a sum of the average values calculated by the traffic amount estimation step, and the bandwidth allocation step allocates a bandwidth indicated by a first threshold to the lower-level apparatus in which the calculated bandwidth exceeds the first threshold and evenly distributes a non-allocated bandwidth within the allocatable bandwidth to the lower-level apparatus in which the calculated bandwidth is equal to or smaller than the first threshold.

\* \* \* \* \*